United States Patent
Hirt et al.

(10) Patent No.: US 10,346,086 B2
(45) Date of Patent: Jul. 9, 2019

(54) DETERMINING AN AGE CATEGORY FOR AN OBJECT STORED IN A HEAP

(71) Applicant: Oracle International Corporation, Redwood Shores, CA (US)

(72) Inventors: Marcus Mattias Hirt, Rigi (CH); Erik Kristofer Gahlin, Stockholm (SE)

(73) Assignee: Oracle International Corporation, Redwood Shores, CA (US)

( * ) Notice: Subject to any disclaimer, the term of this patent is extended or adjusted under 35 U.S.C. 154(b) by 44 days.

(21) Appl. No.: 15/617,319

(22) Filed: Jun. 8, 2017

(65) Prior Publication Data

US 2018/0357008 A1    Dec. 13, 2018

(51) Int. Cl.
    *G06F 3/06* (2006.01)
(52) U.S. Cl.
    CPC .......... *G06F 3/0652* (2013.01); *G06F 3/0604* (2013.01); *G06F 3/0608* (2013.01); *G06F 3/0653* (2013.01); *G06F 3/0664* (2013.01); *G06F 3/0673* (2013.01)
(58) Field of Classification Search
    None
    See application file for complete search history.

(56) References Cited

U.S. PATENT DOCUMENTS

| | | | |
|---|---|---|---|
| 5,933,840 A | 8/1999 | Menon et al. | |
| 6,226,653 B1 | 5/2001 | Alpern et al. | |
| 6,567,905 B2 | 5/2003 | Otis | |
| 7,072,905 B2 | 7/2006 | Garthwaite | |
| 7,548,940 B2 | 6/2009 | Bacon et al. | |
| 7,904,493 B2 | 3/2011 | Schmelter et al. | |
| 8,825,721 B2 | 9/2014 | Hunt et al. | |
| 2005/0081190 A1 | 4/2005 | Betancourt et al. | |
| 2009/0119352 A1 | 5/2009 | Branda et al. | |
| 2013/0318132 A1* | 11/2013 | Basu ................ | G06F 12/0276 707/816 |

OTHER PUBLICATIONS

Goetz, Java theory and practice Garbage collection in the HotSpot JVM, Generational and concurrent garbage collection, IBM Developer Works, Nov. 25, 2003.

* cited by examiner

*Primary Examiner* — Sean D Rossiter
*Assistant Examiner* — Charles J Choi
(74) *Attorney, Agent, or Firm* — Invoke

(57) ABSTRACT

Techniques for determining an age category for an object and identifying objects for memory leak analysis based on age categories are described. An age category classifier generates a set of age categories, each corresponding to a respective time interval. The age category classifier monitors garbage collection processes on the heap. The age category classifier determines a current age category based on a duration of time that has elapsed between (a) an initiation of a current garbage collection cycle and (b) a reference event. The age category classifier identifies objects transferred from one object group to another object group during the current garbage collection cycle. The age category classifier stores the current age category as the transfer age category in the headers of the transferred objects. The transfer age categories of the objects may be used for reducing the number of objects that are analyzed in a memory leak analysis.

20 Claims, 15 Drawing Sheets

DETERMINING AN AGE CATEGORY FOR AN OBJECT STORED IN A HEAP

TECHNICAL FIELD

The present disclosure relates to objects stored in a heap. In particular, the present disclosure relates to determining an age category for an object stored in a heap.

BACKGROUND

A compiler converts source code to (a) machine or object code and/or (b) virtual machine instructions. Source code is written according to a specification directed to the convenience of the programmer. Machine or object code is executable directly by the particular machine environment. An intermediate representation ("virtual machine code/instructions"), such as bytecode, is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
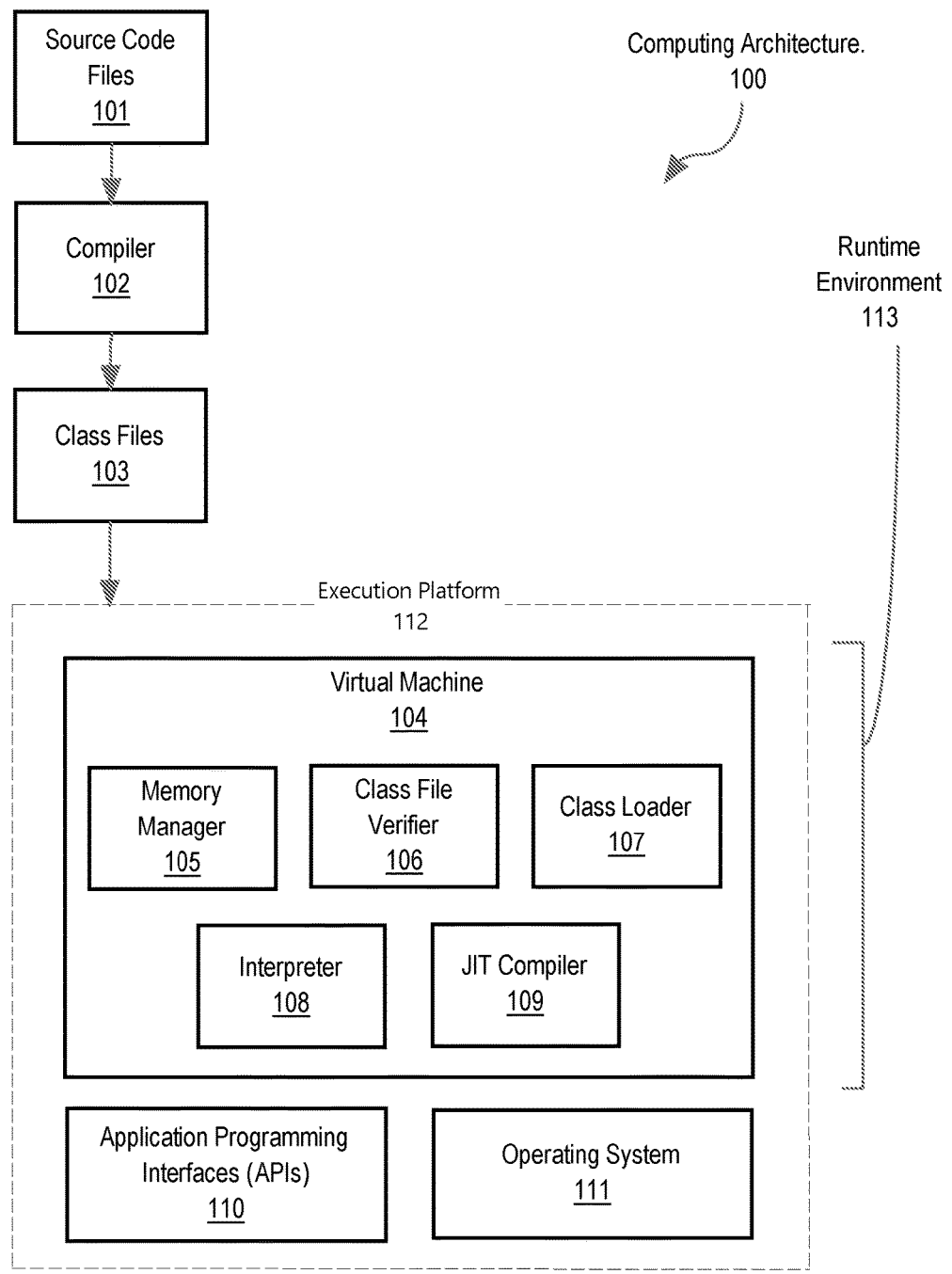
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. GARBAGE COLLECTION
4. AGE TRACKING SYSTEM ARCHITECTURE
5. DETERMINING AN AGE CATEGORY FOR AN OBJECT STORED IN A HEAP
6. IDENTIFYING OBJECTS FOR MEMORY LEAK ANALYSIS BASED ON AGE CATEGORIES
7. EXAMPLE EMBODIMENT
8. MISCELLANEOUS; EXTENSIONS
9. HARDWARE OVERVIEW

1. General Overview

One or more embodiments include determining an age category for an object stored in a heap. A virtual machine and/or device is initiated to execute an application. The application instantiates objects, which are allocated memory space in a heap. An age category classifier generates a set of age categories, each corresponding to a respective time interval. The age category classifier monitors garbage collection processes on the heap. The age category classifier determines a current age category based on a duration of time that has elapsed between (a) an initiation of a current garbage collection cycle and (b) a reference event. The reference event may be, for example, the initiation of the virtual machine and/or device. The age category classifier identifies one or more objects transferred from one object group to another object group during the current garbage collection cycle. As an example, objects may be transferred from a Young Generation object group to an Old Generation object group in a generational garbage collection scheme. The age category classifier assigns the current age category to the transferred objects. The age category classifier stores the current age category as the transfer age category in the headers of the transferred objects upon the transfer of the objects.

In an embodiment, the age category classifier stores the transfer age category in age bits of the headers of the transferred objects. After the transfer of an object from the first object group to the second object group, the age bits of the object are configured to store the transfer age category of the object. However, prior to transfer, the age bits of the object are configured to store information other than one of the age categories. As an example, the age bits may store a number of garbage collection cycles survived by the object.

One or more embodiments include identifying objects for memory leak analysis based on age categories. A memory leak analyzer identifies a set of objects that have been transferred from a first object group to a second object group in a garbage collection scheme. The memory leak analyzer determines that a subset of the set of objects were transferred within a particular time period, relative to a reference event, based on information stored in headers of the subset of objects. The memory leak analyzer may determine that the subset of objects were transferred within the particular time period based on transfer age categories associated with the subset of objects. The transfer age category associated with an object may be stored in a header of the object. The memory leak analyzer selects the subset of objects for memory leak analysis, without selecting the remaining objects for memory leak analysis, based on the transfer age categories associated with the objects. The memory leak analyzer performs memory leak analysis on the subset of objects, without performing memory leak analysis on the remaining objects.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
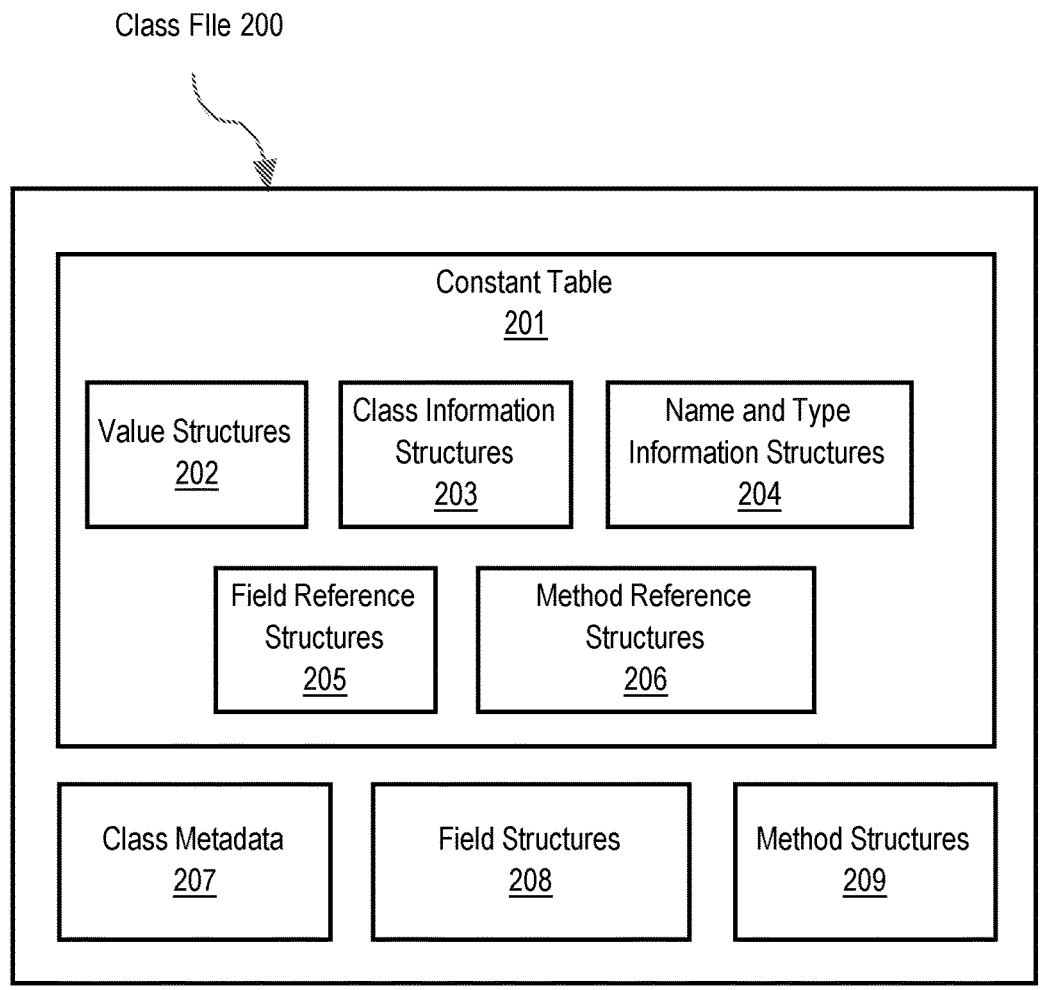
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
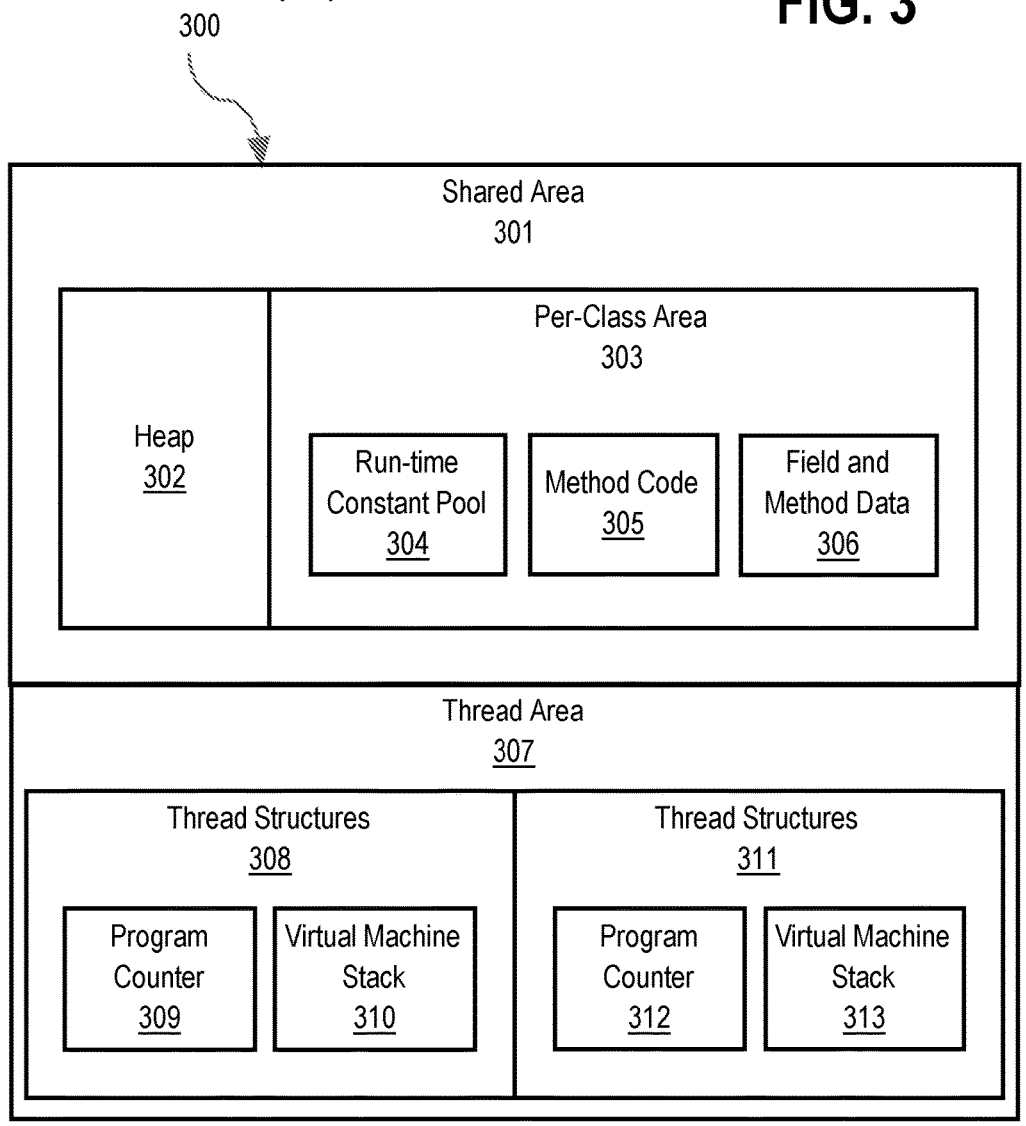
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
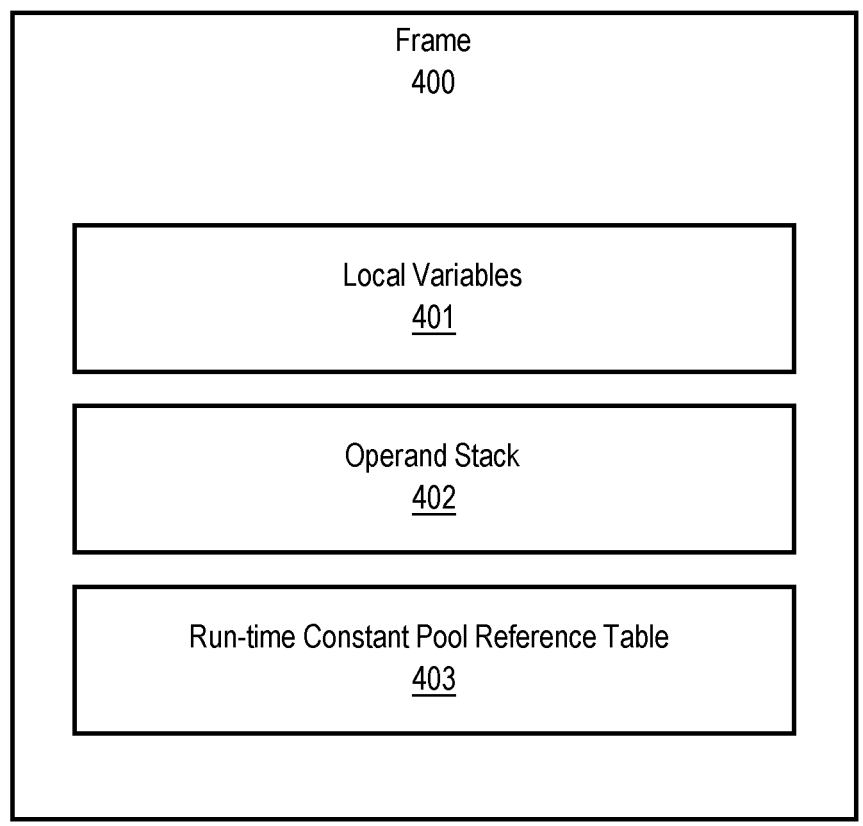
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Garbage Collection

Garbage collection is the process of examining heap memory (such as heap 302 of FIG. 3), identifying which objects are in use and which are not, and deleting the unused objects. Heap memory represents the memory region, including runtime data area, from which memory for class instances and arrays is allocated. Heap memory stores objects that are created during execution of a program. An in-use object (also referred to as a "referenced object" or "live object") means that a part of the program being executed still maintains a pointer to that object. An unused object (also referred to as an "unreferenced object") is no longer referenced by any part of the program. So the memory used by an unreferenced object can be reclaimed for re-allocation. One or more garbage collector threads may perform garbage collection operations in parallel.

In an embodiment, garbage collection may be done asynchronously with pointer management and object usage. One reason for asynchronous garbage collection may be that the garbage collection process itself uses up computer resources (e.g., processor cycles). Asynchronous garbage collection may allow the program to, to an extent, optimize resource usage toward running the program. That said, overall computer resource availability, combined with varying object lifecycles, may cause garbage collection to gain a greater or lesser importance in overall program execution at various times.

One example of a garbage collection algorithm is the mark-and-sweep algorithm. In the mark-and-sweep algorithm, there is a mark phase and a sweep phase.

In the mark phase, the garbage collector traces through a heap memory to identify referenced objects and unreferenced objects. Initially, the garbage collector identifies a root set of objects. The root set may be determined by analyzing registers, global fields, and stack frames at the moment when a garbage collection process is triggered. Examples of objects in the root set include a class loaded by an application class loader, a live thread (such as thread structures 308-311), a local variable or parameter (such as local variables 401 and/or operand stack 402.

During the mark phase, each memory chunk in the heap memory may assume one of four states:
 (a) Free, which means the memory chunk does not store any objects (indicating that the memory chunk may be allocated to new objects);
 (b) Unreached, which means the memory chunk stores an object that has not yet been reached from the root set;
 (c) Unscanned, which means the memory chunk stores an object that has been reached from the root set, but the object's own references have not yet been followed; and
 (d) Scanned, which means the memory chunk stores an object that has been reached from the root set and the object's own references have been followed.

First, the garbage collector assumes that all objects are in an Unreached state. The garbage collector then sets objects in the root set in an Unscanned state. The garbage collector then recursively traces through the objects as follows: while any Unscanned objects remain, (a) examine one of the Unscanned objects; (b) set the examined object in a Scanned state; and (c) set all objects referenced by the examined object in an Unscanned state. When no more Unscanned objects remain, all objects are in either a Scanned state or an Unreached state. Objects in a Scanned state are in-use objects. Objects in an Unreached state are unused objects.

Next, in the sweep phase, the garbage collector sets all objects still in an Unreached state into a Free state. The Free state indicates the memory chunk used for storing these objects may be allocated to new objects. These memory chunks are therefore reclaimed. Additionally, the garbage collector sets all objects in a Scanned state into an Unreached state. This operation prepares the heap memory for the next garbage collection cycle.

Another example of a garbage collection algorithm is the copying algorithm. In the copying algorithm, a heap memory is divided into at least two regions: Region A and Region B. The garbage collector traces through objects of one region, such as Region A, to identify in-use objects. The tracing is similar to the marking phase of the mark-and-sweep algorithm. When the garbage collector reaches an object and sets the object into an Unscanned state, the garbage collector also copies the object to the other region, such as Region B. The garbage collector may maintain a table of the new locations of the in-use objects. When no more Unscanned objects remain, all in-use objects have been copied to Region B. The entire Region A is reclaimed. Any part of Region A may be allocated to new objects. At the next garbage collection cycle, the roles of Region A and Region B are reversed. The garbage collector traces through Region B to identify in-use objects and copies in-use objects to Region A.

Another example of a garbage collection algorithm is the partially-concurrent algorithm. The partially-concurrent algorithm reduces and/or minimizes the time for which an executing application needs to paused for garbage collection operations. The partially-concurrent algorithm performs concurrent tracing, which means that the application continues to execute as the garbage collector marks as being in-use or live. Concurrent tracing begins with an "initial mark pause" and ends with a "remark pause." The initial mark pause occurs while the garbage collector marks as live the objects directly reachable from the root set and from elsewhere in the heap (that is, the remembered set). The remark pause occurs while the garbage collector identifies objects that were missed by the concurrent tracing due to updates, by the application, of references from a particular object after the garbage collector had finished tracing the particular object. After the remark pause, a concurrent sweeping phase collects the objects identified as unreachable.

One or more embodiments include performing generational garbage collection. Generational garbage collection involves partitioning a heap memory into one or more generations. Each generation may be associated with different garbage collection algorithms, different frequencies and/or triggers for performing a garbage collection cycle, different garbage collector threads, and/or other attributes. Since each garbage collection cycle is performed only on one target generation, it is possible that references to objects in the target generation from objects outside of the target generation will be missed. Hence, a "remembered set" of objects is maintained for each generation. The remembered set of a particular generation includes objects outside of the particular generation that refer to one or more objects in the particular generation. When performing garbage collection on the particular generation, tracing begins at both the root set and the remembered set. The remaining garbage collection operations are performed as usual.

Each object is associated with an "object age." An object age is a representation of a duration of time that has elapsed since a reference event. Additionally or alternatively, an object age is a representation of a number of times that certain event(s) have occurred since a reference event. As an example, an object age may be a number of garbage collection cycles that an object has survived. A generation that stores objects that were created more recently is "younger" than a generation that stores objects that were created less recently. As objects age, objects are "promoted" through the generations. Promotion means that the object is moved from a younger generation to an older generation.

One example of generational garbage collection involves at least two generations. The Young Generation includes at least three regions: Eden Region, Survivor Region S0, and Survivor Region S1. The Old Generation includes at least one region: Old Generation Region.

New objects are allocated to the Eden Region. A garbage collection cycle for the Young Generation may be triggered by various events. For example, a garbage collection cycle may be triggered if the Eden Region becomes full. In-use objects in the Eden Region are moved to one of the Survivor Regions, such as Survivor Region S0. In-use objects in the other Survivor Region, such as Survivor Region S1, are also moved to Survivor Region S0. As the in-use objects are moved to Survivor Region S0, the age of each in-use object is incremented by one. The age of an object indicates the number of garbage collection cycles that the object has survived. Then, both the Eden Region and Survivor Region S1 are reclaimed. At the next garbage collection cycle, similar operations are performed, except the roles of Survivor Region S0 and Survivor Region S1 are reversed. Specifically, in-use objects in the Eden Region are moved to Survivor Region S1. In-use objects in Survivor Region S0 are moved to Survivor Region S1. As the in-use objects are moved to Survivor Region S1, the age of each in-use object is incremented by one. Then, both the Eden Region and Survivor Region S0 are reclaimed.

If the age of an in-use object reaches a certain threshold (such as, sixteen), then the object is promoted to the Old Generation. The object is moved to the Old Generation Region, rather than the counterpart Survivor Region. A garbage collection cycle for the Old Generation may be triggered by various events. For example, a garbage collection cycle may be triggered if the Old Generation Region becomes full. Various garbage collection algorithms may be applied to the Old Generation Region. For example, a mark-and-sweep algorithm may be used.

4. Age Tracking System Architecture

Figure 5:
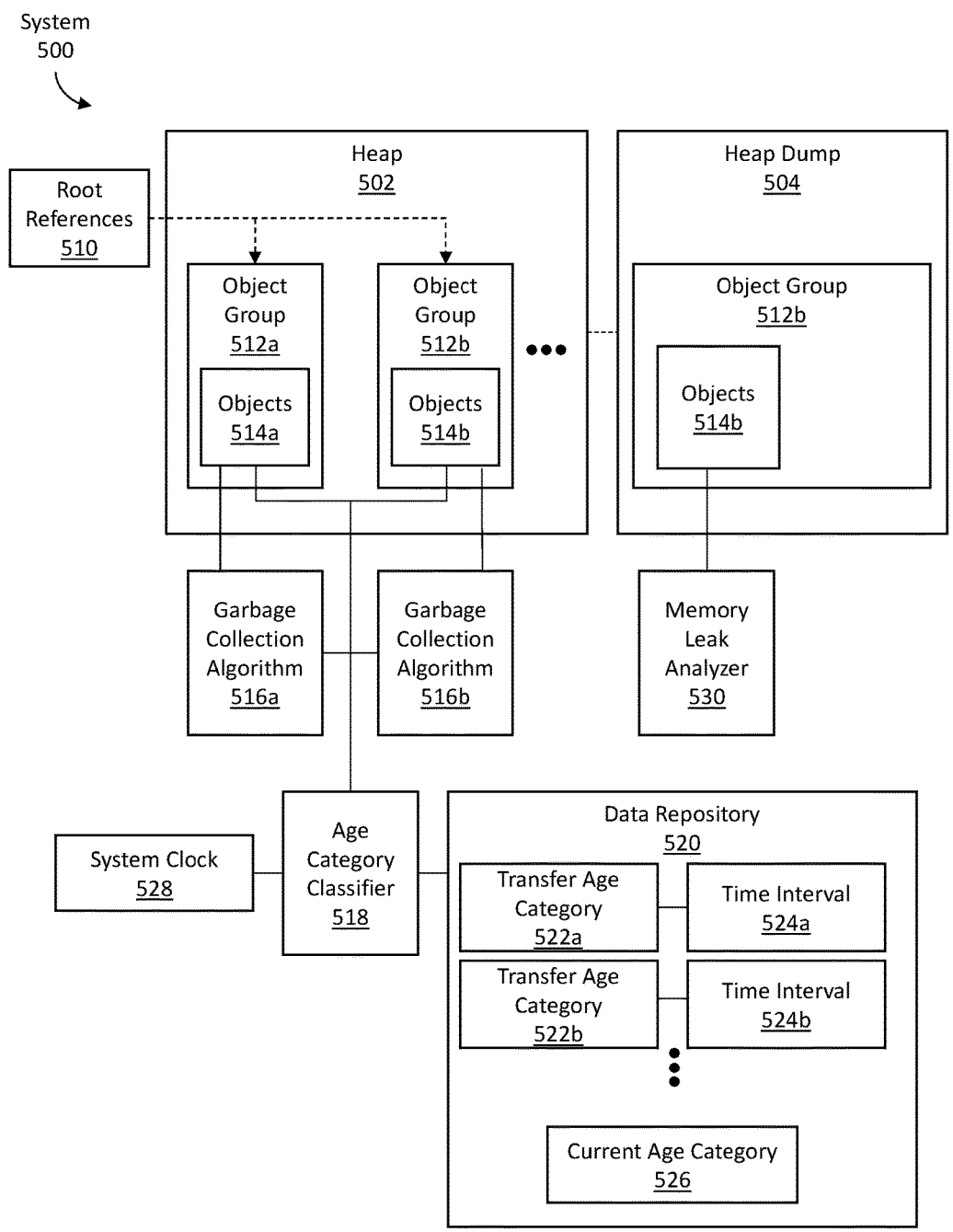
FIG. 5 illustrates an example of an age tracking system, in accordance with one or more embodiments.

FIG. 5 illustrates an example of an age tracking system, in accordance with one or more embodiments. As illustrated in FIG. 5, a system 500 includes a heap 502, a set of root references 510, garbage collection algorithms 516a-b, an age category classifier 518, a system clock 528, a data repository 520, a heap dump 504, and a memory leak analyzer 530. In one or more embodiments, the system 500 may include more or fewer components than the components illustrated in FIG. 5. The components illustrated in FIG. 5 may be local to or remote from each other. The components illustrated in FIG. 5 may be implemented in software and/or hardware. Each component may be distributed over multiple applications and/or machines. Multiple components may be combined into one application and/or machine. Operations described with respect to one component may instead be performed by another component.

In one or more embodiments, a heap 502 is a memory region, including runtime data, from which memory for class instances and arrays is allocated. The heap 502 stores objects that are created during execution of a program.

In one or more embodiments, a root reference 510 is a pointer to an object in a root set. As described above in Section 3, titled "Garbage Collection," a garbage collector traces through a heap 502 to identify in-use objects. The tracing begins with a root set of objects. The root set may be determined by analyzing registers, global fields, and stack frames at the moment when a garbage collection process is triggered. Examples of objects in the root set include a class loaded by an application class loader, a live thread (such as thread structures 308-311), a local variable or parameter (such as local variables 401 and/or operand stack 402.

In one or more embodiments, a heap includes multiple object groups 512a-b. Each object group may be associated with different garbage collection algorithms, different frequencies and/or triggers for performing a garbage collection cycle, different garbage collector threads, and/or other attributes. As an example, object group 512a is associated with garbage collection algorithm 516a, while object group 512b is associated with garbage collection algorithm 516b. As described above in Section 3, titled "Garbage Collection," examples of garbage collection algorithms include a mark-and-sweep algorithm, a copying algorithm, and a partially-concurrent algorithm.

In an embodiment, each object group may be associated with a different generation of a generational garbage collection scheme. As an example, object group 512a may be associated with a Young Generation, while object group 512b may be associated with an Old Generation. Each object group includes a set of objects. As an example, object group 512a includes objects 514a, while object group 512b includes objects 514b. Objects 514a may include in-use objects and/or unused objects. Objects 514b may include in-use objects and/or unused objects.

Objects 514a-b may be transferred between object groups 512a-b. An object group from which a particular object is being transferred may be referred to as a "source object group." An object group to which a particular object is being transferred may be referred to as a "destination object group." In a generational garbage collection scheme, objects may be transferred from a Young Generation object group to an Old Generation object group. The transfer of an object from the Young Generation to the Old Generation may be referred to as a "promotion" of the object.

Figure 6:
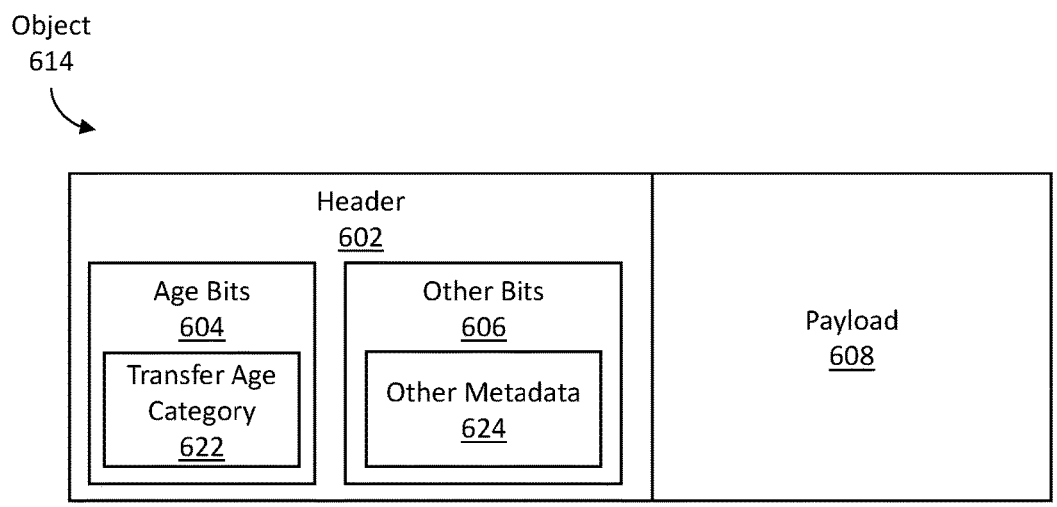
FIG. 6 illustrates an example of an object, including a header and a payload, in accordance with one or more embodiments.

FIG. 6 illustrates an example of an object, including a header and a payload, in accordance with one or more embodiments. An object 614 consists of a header 602 and a payload 608. A payload 608 stores the application data of an application. As an example, for a human resources application, an object's payload may include the following information: an employee's name, address, title, department, and employment start date.

A header 602 stores metadata. The metadata may be used for managing the storage of the object in a memory space. The metadata may be used for interpreting and/or processing the payload 608. Examples of metadata in the header 602 include: an identity hashcode for the payload 608; information used for garbage collection; information used for locking (in multi-thread environments); and/or attributes of the object (such as, the type or class of the object, the fields of the object, and/or the methods that may be executed on the object).

As illustrated, the header 602 includes multiple bits: age bits 604 and other bits 606. Age bits 604 are configured to store an object age of the object 614. The other bits 606 are configured to store other metadata 624. As described above in Section 3, titled "Garbage Collection," various types of object age may be used. One type of object age is a representation of a duration of time that has elapsed since a reference event. Additionally or alternatively, another type of object age is a representation of a number of times that certain event(s) have occurred since a reference event. As an example, an object age may be a number of garbage collection cycles that an object has survived. As another example, an object age may be an interval of time at which the transfer of the object from one object group to another object group occurred, relative to a reference event. The reference event may be, for example, an initiation of a virtual machine and/or device that maintains the object. The lower bound of the interval of time may be the minimum duration of time that has elapsed between (a) the transfer of the object and (b) the reference event. A transfer age category 622 may be used to represent the interval of time at which the transfer of the object from one object group to another object group occurred, relative to the reference event. Transfer age categories are further described below with reference to transfer age categories 522a-b of FIG. 5.

In an embodiment, the age bits 604 of an object 614 are used to store different types of object age, depending on the object group associated with the object 614. As an example, an object 614 may be associated with object group 512a, which may be a Young Generation. While the object 614 is in the Young Generation, the age bits 604 may represent a number of garbage collection cycles that the object 614 has survived. The age bits 604 may be used for determining when to transfer the object 614 to the other object group 512b, which may be an Old Generation. When the object 614 has been through a certain number of garbage collection cycles (for example, sixteen garbage collection cycles), then the object 614 is promoted from the Young Generation to the Old Generation. While the object 614 is in the Old Generation, the same age bits 604 may be used to represent a different set of information. The age bits 604 may represent a minimum duration of time that has elapsed between (a) the promotion of the object from the Young Generation to the Old Generation, and (b) a reference event.

In an embodiment, the number of age bits 604 associated with an object 614 is different, depending on the object group associated with the object 614. However, the age bits 604 of an object 614 while the object 614 is in one object group 512a at least overlaps with the age bits 604 of the object 614 while the object 614 is another object group 512b. As an example, the number of age bits for objects in a Young Generation may be four. In particular, bits 0 to 3 (the first 4 bits of the header 602) may be used as the age bits. The number of age bits for objects in an Old Generation may be six. In particular, bits 0 to 5 (the first six bits of header 602) may be used as age bits. In this example, bit 0 to 3 are used as age bits in association with both the Young Generation and the Old Generation.

Referring back to FIG. 5, in one or more embodiments, a data repository 520 is any type of storage unit and/or device (e.g., a file system, database, collection of tables, or any other storage mechanism) for storing data. Further, a data repository 520 may include multiple different storage units and/or devices. The multiple different storage units and/or devices may or may not be of the same type or located at the same physical site. Further, a data repository 520 may be implemented or may execute on the same computing system as an age category classifier 518. Alternatively or additionally, a data repository 520 may be implemented or executed on a computing system separate from an age category classifier 518. A data repository 520 may be communicatively coupled to an age category classifier 518 via a direct connection or via a network.

Information describing transfer age categories 522a-b, time intervals 524a-b, and current age category 526 may be implemented across any of components within the system 500. However, this information is illustrated within the data repository 520 for purposes of clarity and explanation.

In one or more embodiments, each transfer age category (also referred to as "age category") corresponds to a time interval. The time interval includes durations of time that have elapsed from a reference event. For example, Transfer Age Category t0 may be associated with the time interval, 0 seconds to 19 seconds. Hence, Transfer Age Category t0 is associated with the passing of 0 seconds to 19 seconds, relative to a reference event. Transfer Age Category t1 may be associated with the time interval, 20 seconds to 59 seconds. Hence, Transfer Age Category t1 is associated with the passing of 20 seconds to 59 seconds, relative to the reference event. As illustrated, for example, transfer age category 522a corresponds to time interval 524a, while transfer age category 522b corresponds to time interval 524b.

In an embodiment, the time intervals of a set of age categories may be mutually exclusive. The upper bound of a time interval of a particular age category is less than the lower bound of a time interval of a next age category. Hence, the time intervals of the set of age categories do not overlap.

In an embodiment, a size of time intervals corresponding to different age categories may be different. For example, Transfer Age Category t0 may be associated with the time interval, 0 seconds to 19 seconds. Transfer Age Category t1 may be associated with the time interval, 20 seconds to 59 seconds. The size of the time interval of Transfer Age Category t0 is 19 seconds (which is, the difference value between the lower bound, 0, and the upper bound, 19). The size of the time interval of Transfer Age Category t1 is 39 seconds (which is, the difference value between the lower bound, 20, and the upper bound, 59). Hence, Transfer Age Category t0 and Transfer Age Category t1 are associated with different sizes of time intervals.

A particular transfer age category includes a particular subset of objects that have been transferred from one object group 512a to another object group 512b. Objects in the same transfer age category share at least the following attribute: the time duration between (a) the transfer of each object and (b) a reference event falls within the time interval corresponding to the particular transfer age category. Additionally or alternatively, objects in the same transfer age category share at least the following attribute: the time duration between (a) the initiation of a particular garbage collection cycle (and/or another event associated with the particular garbage collection cycle) that resulted in transferring the object and (b) a reference event falls within the time interval corresponding to the particular transfer age category.

As an example, Transfer Age Category t0 may be associated with the time interval, 0 seconds to 19 seconds. Transfer Age Category t1 may be associated with the time interval, 20 seconds to 59 seconds.

Transfer Age Category t0 may include Object A. The transfer age category of Object A indicates that Object A was promoted from a Young Generation to an Old Generation between 0 and 19 seconds after the initiation of the virtual machine that maintains Object A. The transfer age category of Object A further indicates that the garbage collection cycle that resulted in the promotion of Object A was initiated between 0 and 19 seconds after the initiation of the virtual machine.

Transfer Age Category t1 may include Object B. The transfer age category of Object B indicates that Object B was promoted from a Young Generation to an Old Generation between 20 and 59 seconds after the initiation of the virtual machine that maintains Object B. The transfer age category of Object B further indicates that the garbage collection cycle that resulted in the promotion of Object B was initiated between 20 and 59 seconds after the initiation of the virtual machine.

In one or more embodiments, a current age category 526 refers to the transfer age category associated with the current time. The current age category 526 changes as time passes.

As an example, Transfer Age Category t0 may be associated with the time interval, 0 seconds to 19 seconds. Transfer Age Category t1 may be associated with the time interval, 20 seconds to 59 seconds.

At the time that a virtual machine is initialized to execute an application, the current age category may be Transfer Age Category t0. From 0 to 19 seconds after the initiation of the virtual machine, the current age category may remain Transfer Age Category t0. At 20 seconds after the initiation of the virtual machine, the current age category may become Transfer Age Category t1. From 20 to 59 seconds after the initiation of the virtual machine, the current age category may remain Transfer Age Category t1.

In an embodiment, an array stores a set of transfer age categories 522a-b. For example, a first position in the array corresponds to Transfer Age Category t0; a second position in the array corresponds to Transfer Age Category t1. The current age category 526 is an index into the array. If the transfer age category associated with the current time is Transfer Age Category t0, then current age category 526 is the index 0. If the transfer age category associated with the current time is Transfer Age Category t1, then current age category 526 is the index 1.

In one or more embodiments, a system clock 528 is used to maintain a system time. A system clock 528 may be executed using hardware and/or software. A system clock 528 may be implemented by a physical device and/or a virtual machine. For example, a system clock may be implemented by a quartz crystal located on a motherboard of a device. A system clock 528 may be run at many cycles per second, such as, 200 MHz. A system clock 528 may be used to determine a duration of time (such as, number of milliseconds, seconds, and/or minutes) that has passed.

In one or more embodiments, an age category classifier 518 refers to hardware and/or software configured to perform operations described herein for determining a transfer age category for an object stored in a heap 502. Examples of operations for determining an age category for an object stored in a heap are described below with reference to FIG. 7.

In one or more embodiments, a heap dump 504 is a snapshot of at least a portion of a heap 502. The heap dump 504 includes information about the objects 514a-b in at least a portion of the heap 502, at the moment that the snapshot is captured. As illustrated, for example, heap dump 504 is a snapshot of the region(s) of the heap 502 associated with object group 512b. Object group 512b includes objects 514b.

In one or more embodiments, a memory leak analyzer 530 refers to hardware and/or software configured to perform operations described herein for identifying objects for memory leak analysis based on age categories. Examples of operations for identifying objects for memory leak analysis based on age categories are described below with reference to FIG. 8.

Additionally or alternatively, a memory leak analyzer 530 is configured to perform memory leak analysis. The memory leak analyzer 530 may perform memory leak analysis on only a subset of the objects 514b in the heap dump 504.

A memory leak occurs when object references that are no longer needed are unnecessarily maintained. As an example, an executing application may instantiate Object A and Object B. Object A may include a reference to Object B. Subsequently, the application no longer needs Object B. However, the application does not include instructions for removing Object A's reference to Object B. Since a reference to Object B is maintained, a garbage collector identifies Object B as a live object. The garbage collector fails to recognize that Object B is no longer needed by the application. The failure to garbage collect Object B may be referred to as a "memory leak."

The system 500 may but does not necessarily include a heap dump 504. In an embodiment, a memory leak analyzer 530 analyzes a heap dump 504, as illustrated. The memory leak analyzer 530 performs memory leak analysis on the heap dump 504. In an alternative embodiment, a memory leak analyzer 530 is directly coupled to the heap 502. The memory leak analyzer 530 performs memory leak analysis on the heap 502.

Various methods may be used to analyze a heap dump and/or a heap for identifying a memory leak. Examples of memory leak analysis include: (a) a shortest path to roots analysis on one or more objects in the heap dump and/or heap; (b) a dominator tree analysis on objects in the heap dump and/or heap; (c) an analysis regarding class loaders for one or more objects in the heap dump and/or heap; and (d) an analysis regarding classes or types associated with one or more objects in the heap dump and/or heap. As an example, a memory leak analyzer may determine a shortest path back to the root set of objects for a reference of a certain type from a user-specified transfer age category. As another example, a memory leak analyzer may generate a two-dimensional histogram of instances on the heap that are of a certain type from a user-specified transfer age category. Additionally, the memory leak analyzer can operate without any user input by using heuristics to select the best candidates for the memory leak, using information such as class loading information and code generation information, to estimate the candidates that have been alive for the longest time, but after warmup.

In an embodiment, an age category classifier 518 and/or a memory leak analyzer 530 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

5. Determining an Age Category for an Object Stored in A Heap

Figure 7:
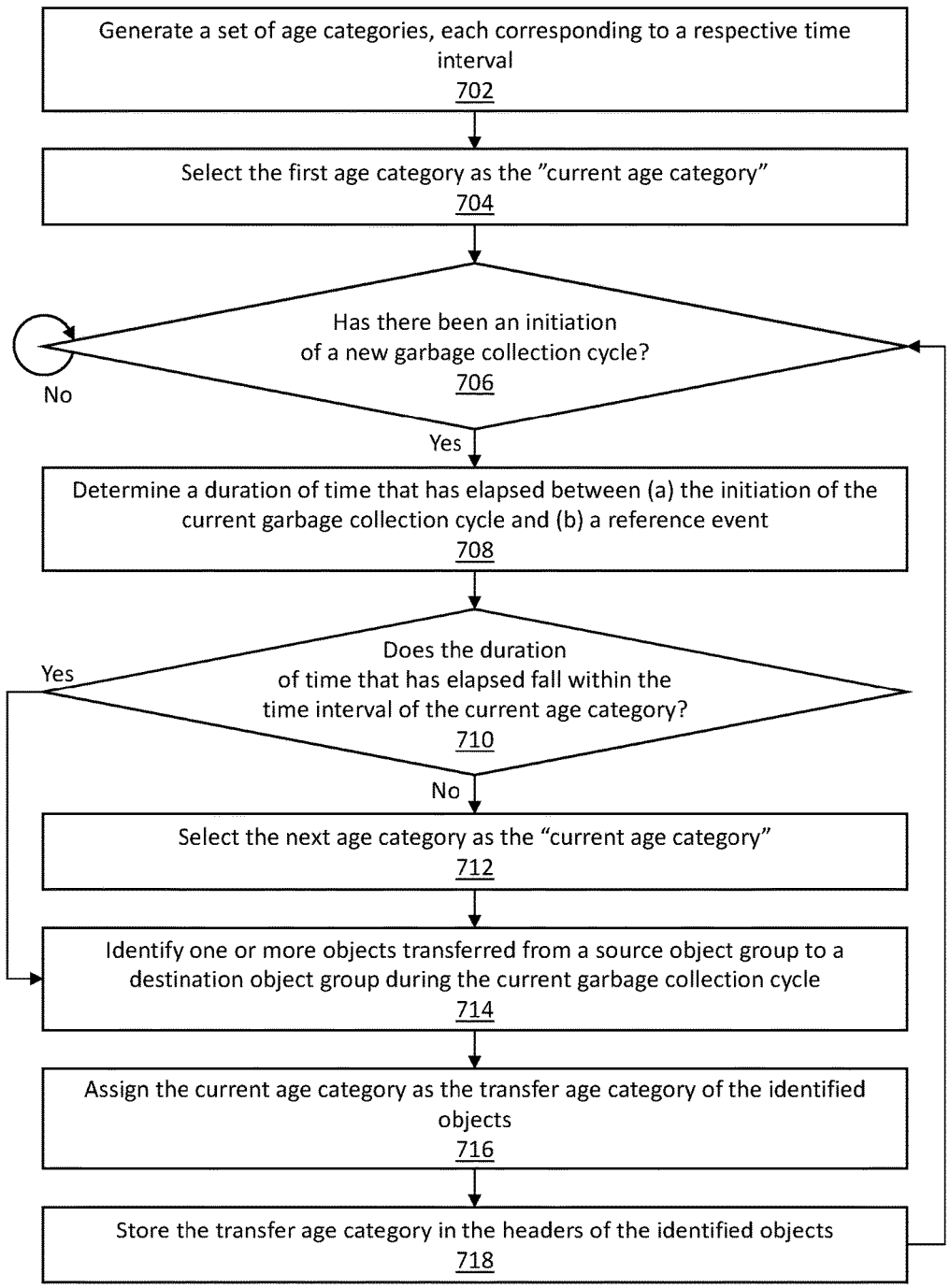
FIG. 7 illustrates an example set of operations for determining an age category for an object stored in a heap, in accordance with one or more embodiments.

FIG. 7 illustrates an example set of operations for determining an age category for an object stored in a heap, in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

One or more embodiments include generating a set of age categories, each corresponding to a respective time interval (Operation 702). An age category classifier 518 generates a set of age categories. The set of age categories may be stored in an array and/or other data structure.

The age category classifier 518 obtains a respective time interval corresponding to each age category. The age category classifier 518 may obtain the time intervals from the runtime environment 113 itself. Additionally or alternatively, the age category classifier 518 may obtain the time intervals based on user input and/or from another application, during the initiation of the virtual machine and/or device.

The time intervals may be specified by using a lower bound of each time interval. The upper bound of a particular time interval is determined based on the lower bound of the next time interval. As an example, a set of age categories and corresponding lower bounds of time intervals may be as follows:

TABLE 1

| Transfer Age Category | Lower Bound of Time interval |
|---|---|
| t0 | 0 seconds |
| t1 | 20 seconds |
| t2 | 1 minute |
| t3 | 5 minutes |
| t4 | 20 minutes |
| t5 | 1 hour |
| t6 | 2 hours |
| t7 | 4 hours |
| t8 | 8 hours |
| t9 | 24 hours |
| t10 | 2 days |
| t11 | 3 days |
| t12 | 4 days |
| t13 | 5 days |
| t14 | 6 days |
| t15 | 7 days |

In the above example, Transfer Age Category t0 corresponds to the following time interval: 0 seconds to 19.99 seconds (less than the lower bound associated with Transfer Age Category t1). Transfer Age Category t1 corresponds to the following time interval: 20 seconds to 59.99 seconds (less than the lower bound associated with Transfer Age Category t2).

One or more embodiments include selecting the first age category as the "current age category" (Operation 704). The age category classifier 518 selects the first age category as the "current age category." In an embodiment, the time interval corresponding to the first age category has a lower bound that is smaller than that of the time intervals corresponding to the remaining age categories.

In an embodiment, the age category classifier 518 stores a set of age categories as an array. The age category classifier 518 sets a "current age category" variable as 0. The "current age category" variable is an index into the array of age categories. An index of 0 refers to the first age category in the array.

One or more embodiments include determining whether there has been an initiation of a new garbage collection cycle (Operation 706). The age category classifier 518 monitors one or more garbage collection threads associated with a source object group. The monitored garbage collection threads may execute garbage collection operations on objects within the source object group, and/or garbage collection operations that transfer or promote objects from the source object group to a destination object group. The age category classifier 518 queries the garbage collection threads to determine whether a garbage collection cycle has been initiated. Additionally or alternatively, a garbage collection thread that initiates a garbage collection cycle notifies the age category classifier 518 upon initiation of the garbage collection cycle.

One or more embodiments include determining a duration of time that has elapsed between (a) the initiation of the current garbage collection cycle and (b) a reference event (Operation 708). The age category classifier 518 determines a time associated with the initiation of the current garbage collection cycle based on a system clock.

In an embodiment, a system clock maintains a system time for the virtual machine and/or device that maintains objects in a heap memory. At the time that the current garbage collection cycle is initiated, the age category classifier 518 accesses a system clock to determine the current time. Additionally, the age category classifier 518 retrieves, from a data repository, a time at which the reference event occurred. The time at which the reference event occurred was also determined based on the system clock. The age category classifier 518 determines a difference between (a) the current time (the time at which the current garbage collection cycle is initiated) and (b) the time at which the reference event occurred. The reference event may be, for example, an initiation of the virtual machine and/or device that executes the application. The virtual machine and/or device may maintain the objects in the heap.

As an example, an age category classifier may access a system clock to determine that a time at which the current garbage collection cycle is initiated is Jan. 1, 2017, at 10:30:55 a.m. The age category classifier may further determine that a time at which the virtual machine was initiated is Jan. 1, 2017, at 10:28:55 a.m. The age category classifier may determine that a difference between the two times is 2 minutes. The age category classifier may determine that a duration of time that has elapsed between (a) the initiation of the current garbage collection cycle and (b) the reference event is 2 minutes.

In an embodiment, a system clock reports the time that has elapsed since the occurrence of the reference event. At the time that the current garbage collection cycle is initiated, the age category classifier 518 accesses a system clock to determine a timestamp corresponding to the current garbage collection cycle. The timestamp indicates the duration of time that has elapsed between (a) the initiation of the current garbage collection cycle and (b) the reference event.

As described above, the initiation of the current garbage collection cycle is used for determining the current age category. However, other events associated with the current garbage collection cycle may alternatively be used. As an example, the start of a marking phase of the current garbage collection cycle may be used for determining the current age category. As another example, the completion of a marking phase of the current garbage collection cycle may be used for determining the current age category.

Additionally or alternatively, objects may be transferred from a source object group to a destination object group during performance of a particular set of operations that includes a sweep of the heap. The particular set of operations may but does not necessarily include a garbage collection. The particular set of operations may be repeatedly performed on the heap; each performance may be referred to as a "cycle." Any event that is associated with all objects transferred during a single cycle may be used for determining the current age category. As an example, the start of a heap sweep may be used for determining the current age category.

In an embodiment, the transfer of a particular object from a source object group to a destination object group is not an event that may be used for determining the current age category. Since each object is transferred from the source object group to a destination object group at different times, there is no single transfer event that is associated with all transferred objects. Hence, the initiation or completion of the transfer of an object from the source object group to a destination object group is not used for determining the current age category.

One or more embodiments include determining whether the duration of time that has elapsed falls within the time interval of the current age category (Operation 710). The age category classifier 518 determines the time interval of the current age category. Using the example age categories listed by Table 1, if the current age category is Transfer Age Category t0, then an age category classifier may determine that the corresponding time interval is 0 seconds to 19.99 seconds. If the current age category is Transfer Age Category t1, then the age category classifier may determine that the corresponding time interval is 20 seconds to 59.99 seconds.

The age category classifier 518 compares the time that has elapsed, determined at Operation 708, with the time interval of the current age category. The age category classifier 518 determines whether the time that has elapsed falls within the time interval, or falls outside of the time interval.

As an example, the current age category may be Transfer Age Category t2. An age category classifier may determine that the corresponding time interval is 1 minute to 19 minutes, 59.99 seconds. The age category classifier may determine that the time that has elapsed between (a) an initiation of the current garbage collection cycle and (b) a reference event is 2 minutes, 15 seconds. The age category classifier may determine that 2 minutes, 15 seconds falls outside of the time interval 1 minute to 19 minutes, 59.99 seconds.

If the duration of time that has elapsed does not fall within the time interval of the current age category, then the age category classifier 518 selects the next age category as the "current age category" (Operation 712). The age category classifier 518 selects the next age category as the "current age category."

As an example, a current age category may be Transfer Age Category t3. An age category classifier may determine that a garbage collection cycle has been initiated. The age category classifier may determine that a duration of time that has elapsed between (a) the initiation of the current garbage collection cycle and (b) a reference event falls outside of the time interval of Transfer Age Category t3. The age category classifier may then determine that the current age category is changed from Transfer Age Category t3 to Transfer Age Category t4.

In an embodiment, the age category classifier 518 stores a set of age categories as an array. A "current age category" variable serves as an index into the array of age categories. The age category classifier 518 increments the "current age category" variable, such that the "current age category" variable indexes into the next age category.

One or more embodiments include identifying one or more objects transferred from a source object group to a destination object group during the current garbage collection cycle (Operation 714). The age category classifier 518 monitors one or more garbage collection threads associated with the source object group. As described above with reference to Operation 706, the monitored garbage collection threads may execute garbage collection operations on objects within the source object group, and/or garbage collection operations that transfer or promote objects from the source object group to a destination object group. The age category classifier 518 identifies the objects being transferred from the source object group to a destination object group.

As an example, a generational garbage collection scheme may specify that a threshold object age for promoting an object from a Young Generation to an Old Generation is sixteen. A garbage collection thread may execute a garbage collection cycle to perform garbage collection on the Young Generation. After the current garbage collection cycle, Object A would have survived five garbage collection cycles, and Object B would have survived seventeen garbage collection cycles. The garbage collector thread may increment the object age of Object A to indicate that Object A has survived five garbage collection cycles. Object A may remain in the Young Generation. Since the object age for Object B has exceeded the threshold of sixteen, the garbage collector thread may promote Object B from the Young Generation to the Old Generation. An age category classifier may identify Object B as an object being transferred during the current garbage collection cycle. Object A is not an object being transferred during the current garbage collection cycle.

One or more embodiments include assigning the current age category as the transfer age category of the identified objects (Operation 716). The age category classifier 518 assigns the current age category as the transfer age category of the transferred objects identified at Operation 714. The current age category was previously determined at Operation 704 and/or Operation 712.

In an embodiment, all objects that are transferred from the source object group to a destination object group are assigned to the same transfer age category. There is no need for the age category classifier 518 to make additional accesses to a system clock to determine a transfer age category for each transferred object.

One or more embodiments include storing the transfer age category in the headers of the identified objects (Operation 718). The age category classifier 518 stores the transfer age category, determined at Operation 716, in the headers of the transferred objects, identified at Operation 714.

In an embodiment, the age category classifier 518 stores the transfer age category in the age bits of a header of an object. While the object was associated with the source object group, the age bits were configured to store a particular type of object age, for example, the number of garbage collection cycles survived by the object while in the source object group. Upon transfer of the object from the source object group to the destination object group, the purpose of the same age bits is modified. The age bits are now configured to store the transfer age category of the object. Hence, there is no need for additional bits to be appended onto the header to store the transfer age category of the object. The object, having a header that includes age bits storing the transfer age category, is stored in association with the destination object group. The above-described method for determining an age category of an object may be a computationally inexpensive way of recording age classification information for one or more objects on the heap, with no extra memory overhead.

In one or more embodiments, the age category classifier 518 may perform a reset on the age tracking system 500. During the reset process, the transfer age categories for the objects may be in an undefined state. Thus, for the duration of a reset process, transfer age categories for the objects are not available. Resetting the age tracking system 500 includes: (a) resetting the current age category to the first of the set of transfer age categories; (b) modifying the transfer age category of each object in a destination object group is set to the first of the set of transfer age categories; and (c) modifying the time intervals corresponding to the transfer age categories. Examples of these operations are further described below.

The age category classifier 518 resets the current age category to the first of the set of transfer age categories. The first of the set of transfer age categories includes all objects that were transferred from a source object group to a destination object group before the execution of the reset operation. Using the example age categories listed in Table 1, an age category classifier may reset the current age category to Transfer Age Category t0.

The age category classifier 518 modifies the transfer age category of each object in a destination object group to be the first of the set of transfer age categories. The modification of the transfer age categories of the objects may be performed concurrently with the execution of the application that caused instantiation of the objects. Using the example age categories listed in Table 1, an age category classifier may modify the transfer age category of each object in a destination object group to Transfer Age Category t0. The age category classifier may overwrite the information stored in the age bits of the headers of the objects with information identifying Transfer Age Category t0.

The age category classifier 518 modifies the time intervals corresponding to the transfer age categories. As an example, the initial time intervals may be the example time intervals as listed in Table 1. An age category classifier may use the example time intervals as listed in Table 1 to determine transfer age categories for an initial set of objects. At three hours after the initiation of the virtual machine, the age category classifier may perform a reset of the age tracking system. The age category may modify the time intervals corresponding to the transfer age categories. The lower bound of the time interval of Transfer Age Category t0 remains zero seconds. The lower bound of the time interval of the next category, Transfer Age Category t1, becomes the time at which the reset operation was executed, which is three hours in this example. The time intervals of the remaining transfer age categories may be determined based on user input and/or another application. An example of the set of age categories and corresponding modified lower bounds of time intervals may be as follows:

TABLE 2

| Transfer Age Category | Lower Bound of Time interval |
| --- | --- |
| t0 | 0 seconds |
| t1 | 3 hours |
| t2 | 3 hours, 20 seconds |
| t3 | 3 hours, 1 minute |
| t4 | 3 hours, 5 minutes |
| t5 | 3 hours, 20 minutes |
| t6 | 4 hour |
| t7 | 5 hours |
| t8 | 7 hours |
| t9 | 11 hours |
| t10 | 27 hours |
| t11 | 2 days, 3 hours |
| t12 | 3 days, 3 hours |
| t13 | 4 days, 3 hours |
| t14 | 5 days, 3 hours |
| t15 | 6 days, 3 hours |

As described above, the reset operation sets the current age category to the first of the set of age categories, such as Transfer Age Category t0. After the execution of the reset operation, the age category classifier 518 determines the transfer age categories of objects based on the modified age categories. The age category classifier 518 performs Operations 706-718 as described above using the modified age categories.

Using the example age categories listed by Table 2, as described above, the reset operation was executed at three hours after the initiation of the virtual machine. The current age category may be Transfer Age Category t0, which corresponds to the time interval, 0 seconds to 2 hours, 59.99 minutes. The current garbage collection cycle may be initiated at three hours, ten seconds after the initiation of the virtual machine. An age category classifier may determine that the elapsed time (3 hours, 10 seconds) does not fall within the time interval of Transfer Age Category t0 (0 seconds to 2 hours, 59.99 minutes). The age category classifier may then set the next age category, Transfer Age Category t1, as the current age category.

The age category classifier may identify objects transferred during the current garbage collection cycle. The age category classifier may assign the current age category, Transfer Age Category t1, to the identified objects. The age category classifier may store information identifying Transfer Age Category t1 in the headers of the identified objects.

6. Identifying Objects for Memory Leak Analysis Based on Age Categories

Figure 8:
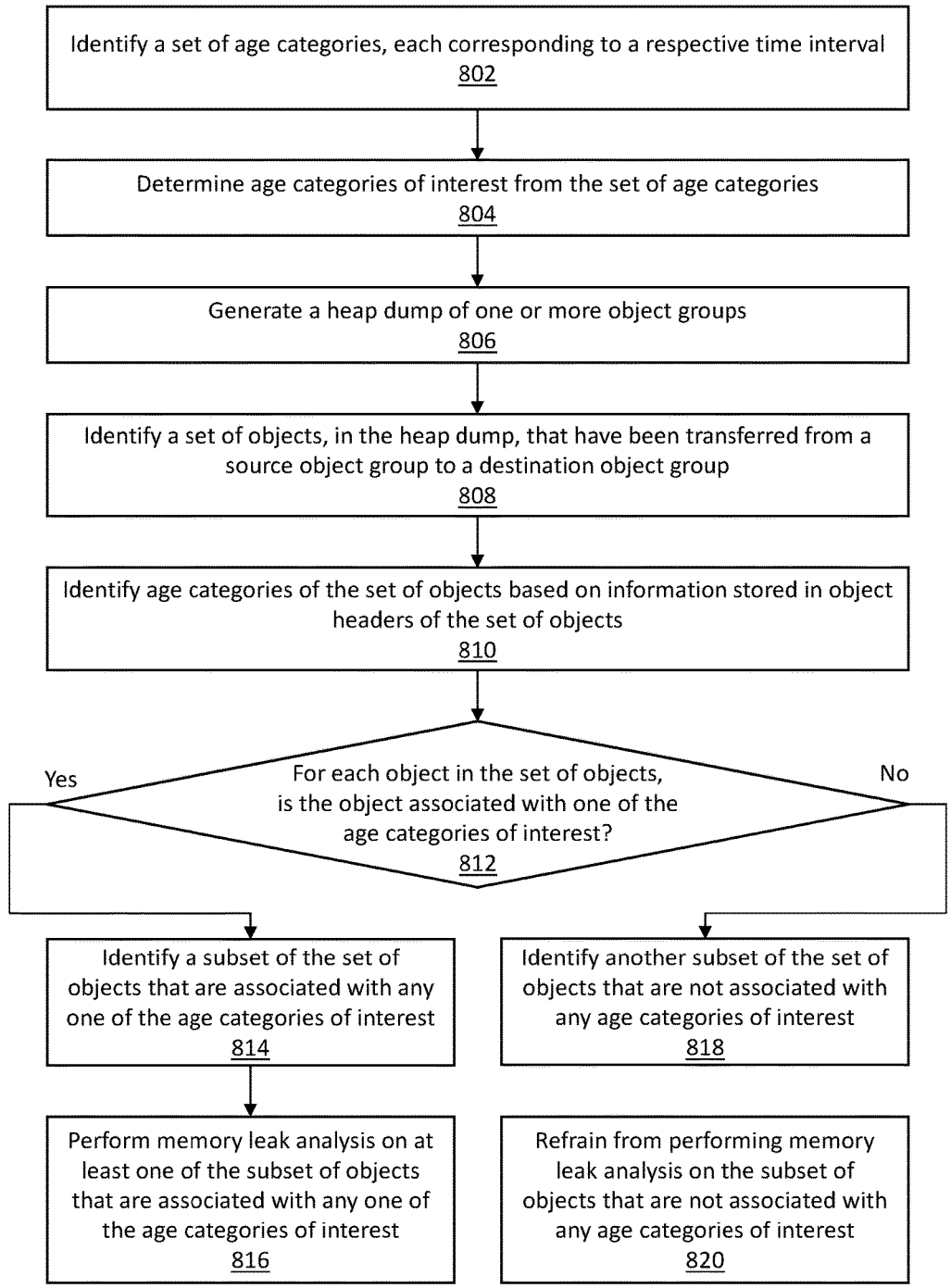
FIG. 8 illustrates an example set of operations for identifying objects for memory leak analysis based on age categories, in accordance with one or more embodiments.

FIG. 8 illustrates an example set of operations for identifying objects for memory leak analysis based on age categories, in accordance with one or more embodiments. One or more operations illustrated in FIG. 8 may be modified, rearranged, or omitted all together. Accordingly, the particular sequence of operations illustrated in FIG. 8 should not be construed as limiting the scope of one or more embodiments.

One or more embodiments include identifying a set of age categories, each corresponding to a respective time interval (Operation 802). A memory leak analyzer 530 identifies a set of age categories associated with objects stored in a particular heap memory. The memory leak analyzer 530 may obtain the set of age categories, and the corresponding time intervals, from the runtime environment 113 itself. Additionally or alternatively, the memory leak analyzer 530 may obtain the set of age categories, and the corresponding time intervals, based on user input and/or from another application. The set of age categories obtained by the memory leak analyzer 530 is the same as the set of age categories generated by an age category classifier 518 at Operation 702 of FIG. 7.

One or more embodiments include determining age categories of interest from the set of age categories (Operation 804). The memory leak analyzer 530 obtains the age categories of interest based on user input and/or from another application.

Using the example age categories listed by Table 1, a user may select Transfer Age Category t2 and Transfer Age Category t3 are age categories of interest. The user may determine that objects that are promoted from a Young Generation to an Old Generation shortly after an initiation of the virtual machine are not of interest in a memory leak analysis. The user may determine that one minute constitutes the time period during which the promotions are not of interest. The user may determine that these objects are not of interest because objects promoted shortly after the initiation of the virtual machine are generally objects created as part of the initiation of the virtual machine and/or objects instantiated based on a runtime image. However, the user may determine that objects promoted approximately one minute to nineteen minutes after the initiation of the virtual machine are of interest. Hence, the user may enter user input indicating that Transfer Age Category t2 and Transfer Age Category t3 are age categories of interest. A memory leak analyzer may obtain the age categories of interest based on the user input.

In an embodiment, the memory leak analyzer 530 determines the age categories of interest based on heuristics. As an example, a memory leak analyzer may identify the first age category after warm-up of the virtual machine as an age category of interest. The memory leak analyzer may determine that the warm-up has completed based on a rate of classes loaded and/or a rate of compilation.

One or more embodiments include generating a heap dump of one or more object groups (Operation 806). The memory leak analyzer 530 generates a heap dump of an entire heap or only a portion of the heap. The memory leak analyzer 530 may generate a heap dump of contiguous or a non-contiguous regions of the heap. The memory leak analyzer 530 may generate a heap dump of regions of the heap associated with only a subset of object groups. As an example, a memory leak analyzer may generate a heap dump of regions of the heap associated with a destination object group. The destination object group includes objects that have been transferred from another object group by a garbage collector.

In an embodiment, Operation 806 is not performed. The memory leak analyzer 530 may perform memory leak analysis directly on the heap, without generating a heap dump. As an example, a memory leak analyzer may determine a shortest path back to the root set of objects for a reference of a certain type from a user-specified transfer age category. As another example, a memory leak analyzer may generate a two-dimensional histogram of instances on the heap that are of a certain type from a user-specified transfer age category.

One or more embodiments include identifying a set of objects, in the heap dump, that have been transferred from a source object group to a destination object group (Operation 808). The memory leak analyzer 530 identifies a destination object group that is included in the heap dump generated at Operation 806. The destination object group may be, for example, an Old Generation object group in a generational garbage collection scheme. The memory leak analyzer 530 identifies the objects in the destination object group as a set of objects that were previously transferred from a source object group.

One or more embodiments include identifying age categories of the set of objects based on information stored in the headers of the set of objects (Operation 810). The memory leak analyzer 530 processes the headers of the set of objects. The memory leak analyzer 530 identifies bits of the headers that are configured to store the transfer age categories of the objects. In an embodiment, the bits of the headers that store the transfer age categories are age bits. The age bits store the transfer age category of an object when the object has been transferred to the destination object group. Meanwhile, the age bits store different information (such as, the number of garbage collection cycles survived by the object) when the object is in the source object group. Based on the headers of the objects, the memory leak analyzer 530 identifies a transfer age category corresponding to each object. The transfer age category was previously determined and/or stored by the age category classifier 518 at Operation 716 and/or Operation 718 of FIG. 7.

In an embodiment, the memory leak analyzer 530 determines a minimum duration of time that has elapsed between (a) the transfer of a particular object from a source object group to a destination object group, and (b) a reference event, based on the transfer age category stored in the header of the particular object. The minimum duration of time that has elapsed between the transfer and the reference event is equal to the lower bound of the time interval of the transfer age category of the particular object. The memory leak analyzer 530 may determine the minimum duration of time that has elapsed between the transfer and the reference event without using any information stored externally to the particular object.

In an embodiment, the memory leak analyzer 530 determines a maximum duration of time that has elapsed between (a) the transfer of a particular object from a source object group to a destination object group, and (b) a reference event, based on the transfer age category stored in the header of the particular object. The maximum duration of time that has elapsed between the transfer and the reference event is equal to the upper bound of the time interval of the transfer age category of the particular object. The memory leak analyzer 530 may determine the maximum duration of time that has elapsed between the transfer and the reference event without using any information stored externally to the particular object.

Using the example age categories listed in Table 1, a memory leak analyzer may determine that a header of a particular object indicates that the particular object is associated with Transfer Age Category t2. Based on Table 1, the lower bound of the time interval corresponding to Transfer Age Category t2 is one minute. Hence, the memory leak analyzer may determine that the particular object was transferred from a source object group to a destination group at least one minute after a reference event (such as, the initiation of the virtual machine). Further, the upper bound of the time interval corresponding to Transfer Age Category t2 is five minutes. Hence, the memory leak analyzer may determine that the particular object was transferred from a source object group to a destination group no later than five minutes after the reference event.

One or more embodiments include determining which of the set of objects are associated with an age category of interest (Operation 812). The memory leak analyzer 530 compares the transfer age category of each object to the age categories of interest. If the transfer age category of a particular object is the same as one of the age categories of interest, then the object is included in a memory leak analysis. If the transfer age category of a particular object is not the same as any of the age categories of interest, then the object is not included in a memory leak analysis.

One or more embodiments include identifying a subset of the set of objects that are associated with any one of the age categories of interest (Operation 814). Based on the inquiry at Operation 812, the memory leak analyzer 530 identifies the subset of objects that are associated with any one of the age categories of interest.

One or more embodiments include performing memory leak analysis on at least one of the subset of objects that are associated with any one of the age categories of interest (Operation 816). The memory leak analyzer 530 performs memory leak analysis on one or more objects associated with the age categories of interest. As an example, the memory leak analyzer 530 may perform a shortest path to roots analysis on the subset of objects associated with the age categories of interest. The memory leak analyzer 530 may perform a dominator tree analysis on the subset of objects associated with the age categories of interest. The memory leak analyzer 530 may perform an analysis regarding class loaders for the subset of objects associated with the age categories of interest. The memory leak analyzer 530 may perform an analysis regarding classes or types associated with the subset of objects associated with the age categories of interest. Additionally or alternatively, the memory leak analyzer 530 may perform other types of memory leak analysis on the subset of objects associated with the age categories of interest.

In an embodiment, the memory leak analyzer 530 performing memory leak analysis on the subset of objects associated with the age categories of interest, while the virtual machine and/or device continues executing the application that generated the set of objects. The memory leak analysis may be performed concurrently with the execution of the application.

One or more embodiments include identifying another subset of the set of objects that are not associated with any age categories of interest (Operation 818). Based on the inquiry at Operation 812, the memory leak analyzer 530 identifies the subset of objects that are not associated with any one of the age categories of interest.

One or more embodiments include refraining from performing memory leak analysis on the subset of objects that are not associated with any age categories of interest (Operation 820). The memory leak analyzer 530 does not perform memory leak analysis on the subset of objects that are not associated with any age categories of interest.

Memory leak analysis may be a resource-intensive and/or time-intensive process. The memory leak analyzer 530 narrows down the objects to be analyzed based on the duration of time that elapsed between (a) the transfer of the objects to a destination group and (b) a reference event. The memory leak analyzer 530 may identify the objects to be analyzed based on the transfer age categories of the objects. Since only objects associated with age categories of interest are analyzed, the number of objects to be analyzed is reduced. The objects that are more likely to include a memory leak issue are analyzed, while the objects that are less likely to include a memory leak issue are not analyzed.

7. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 9A-F illustrate an example of determining age categories for objects stored in a heap, in accordance with one or more embodiments.

A heap 902 includes two object groups: Young Generation 912a and Old Generation 912b. The Young Generation 912a further includes three regions: Eden 913a, Survivor S0 913b, Survivor S1 913c.

Figure 9A:
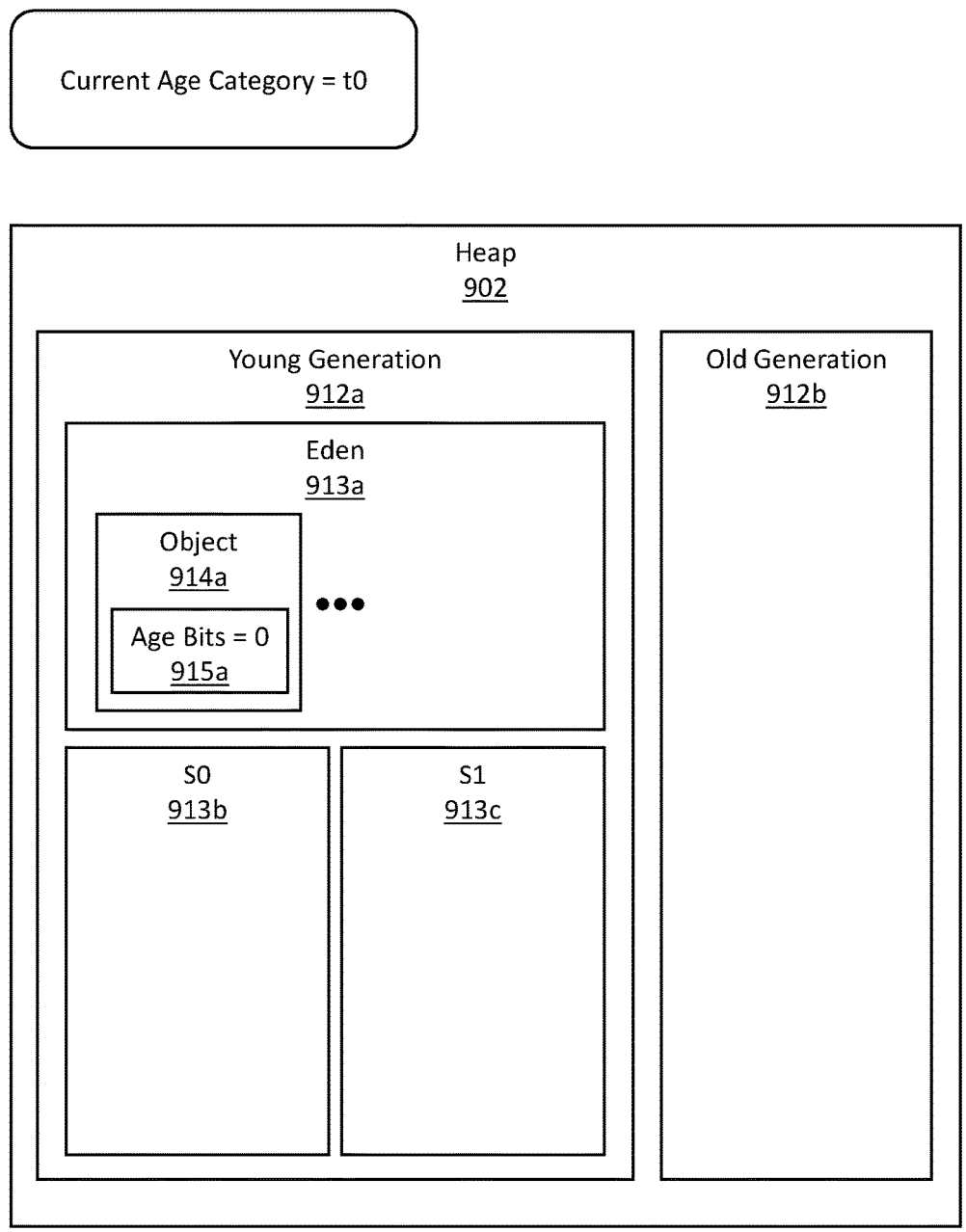
FIGS. 9A-F illustrate an example of determining age categories for objects stored in a heap, in accordance with one or more embodiments.

Referring to FIG. 9A, a virtual machine is initiated. An age category classifier initially sets the current age category to the first age category of a set of age categories. Using the example age categories listed in Table 1, the first of the set of age categories may be Transfer Age Category t0.

The virtual machine executes an application that instantiates one or more objects (such as object 914a). The objects are allocated to Eden 913a of the Young Generation 912a. Each object is associated with a header, which includes age bits. When objects are in the Young Generation 912a, the age bits of the objects are configured to store a number of garbage collection cycles survived by the objects. Since objects in Eden 913a are newly instantiated, the objects in Eden 913a have not undergone any garbage collection cycles. The age bits of the objects in Eden 913a indicate an object age of 0. As illustrated, for example, object 914a is associated with age bits 915a, which indicate that the object age of object 914a is 0.

Figure 9B:
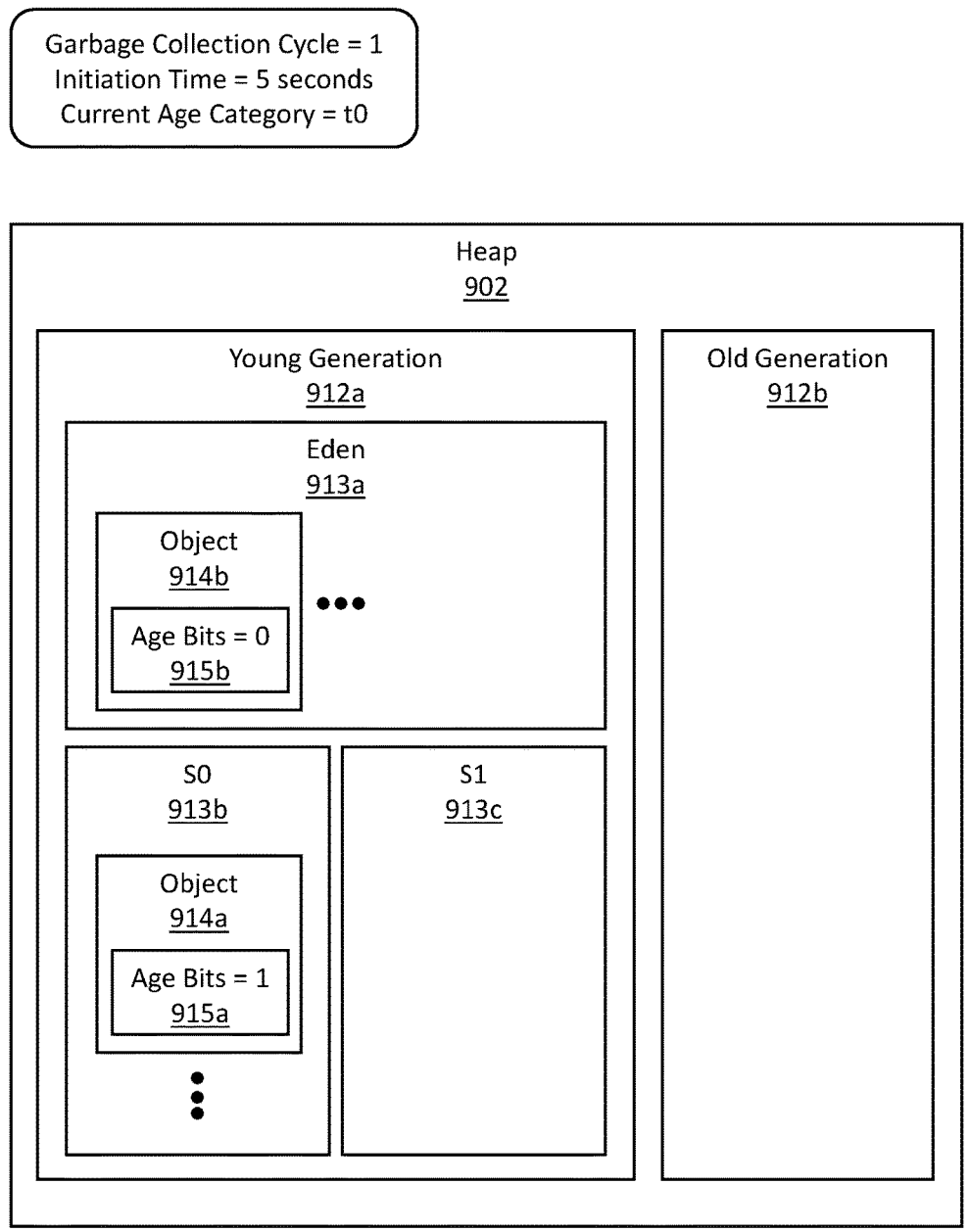

Referring to FIG. 9B, eventually, Eden 913a becomes full. A first garbage collection cycle is triggered. The time at which the first garbage collection cycle is initiated is 5 seconds after the initiation of the virtual machine. Since the time interval of Transfer Age Category t0 is 0 seconds to 19.99 seconds, the age category classifier determines that the initiation time of the second garbage collection cycle falls within the time interval of Transfer Age Category t0. The current age category remains Transfer Age Category t0.

Before the initiation of the first garbage collection cycle, Eden 913*a* stores object 914*a*, with age bits 915*a* set to 0. During the first garbage collection cycle, the garbage collector moves object 914*a* to S0 913*b*. The garbage collector also increments age bits 915*a* to 1.

After the first garbage collection cycle, the application instantiates additional objects (such as object 914*b*). The objects are allocated to Eden 913*a* of the Young Generation 912*a*. Object 914*b* is associated with age bits 915*b*, which are initially set to 0.

Figure 9C:
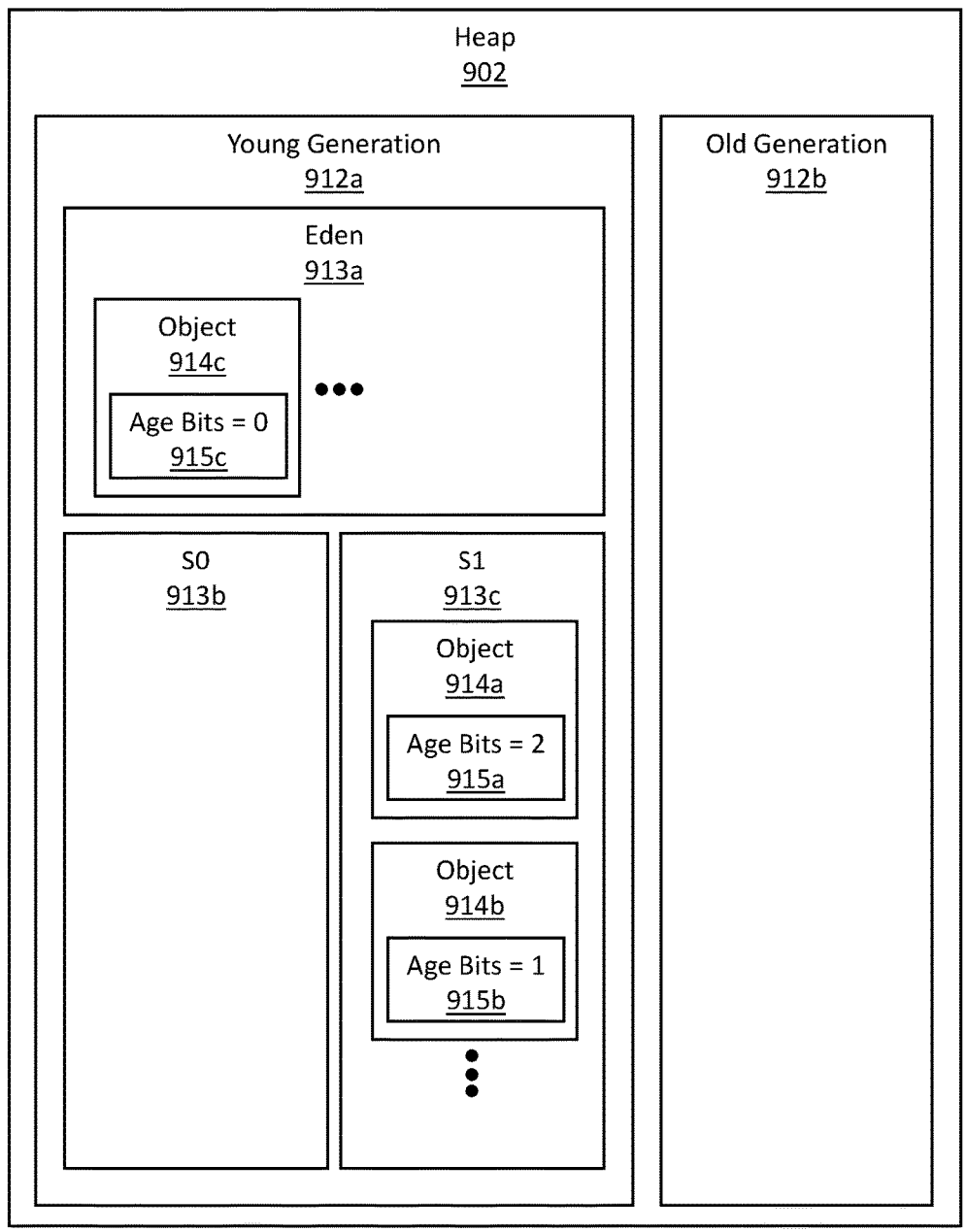

Referring to FIG. 9C, eventually, Eden 913*a* becomes full. A second garbage collection cycle is triggered. The time at which the second garbage collection cycle is initiated is 11 seconds after the initiation of the virtual machine. Since the time interval of Transfer Age Category t0 is 0 seconds to 19.99 seconds, the age category classifier determines that the initiation time of the first garbage collection cycle falls within the time interval of Transfer Age Category t0. The current age category remains Transfer Age Category t0.

Before the initiation of the second garbage collection cycle, S0 913*b* stores object 914*a*, with age bits 915*a* set to 1. Further, Eden 913*a* stores object 914*b*, with age bits 915*b* set to 0. During the first garbage collection cycle, the garbage collector moves object 914*a* to S1 913*c* and increments age bits 915*a* to 2. The garbage collector moves object 914*b* to S1 913*c* and increments age bits 915*b* to 1.

After the second garbage collection cycle, the application instantiates additional objects (such as object 914*c*). The objects are allocated to Eden 913*a* of the Young Generation 912*a*. Object 914*c* is associated with age bits 915*c*, which are initially set to 0.

Figure 9D:
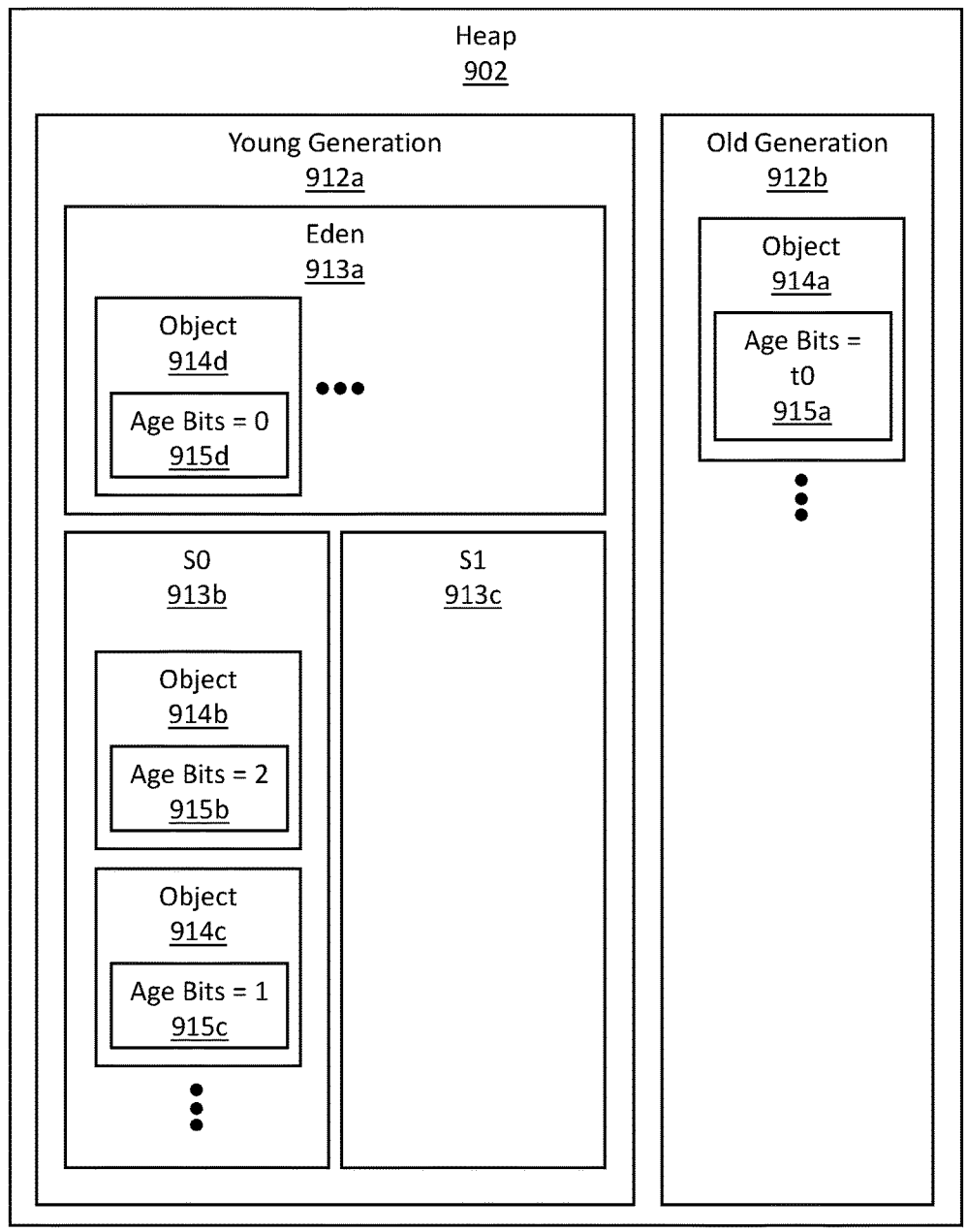

Referring to FIG. 9D, eventually, Eden 913*a* becomes full. A third garbage collection cycle is triggered. The time at which the third garbage collection cycle is initiated is 18 seconds after the initiation of the virtual machine. Since the time interval of Transfer Age Category t0 is 0 seconds to 19.99 seconds, the age category classifier determines that the initiation time of the third garbage collection cycle falls within the time interval of Transfer Age Category t0. The current age category remains Transfer Age Category t0.

Before the initiation of the third garbage collection cycle, S1 913*c* stores object 914*a*, with age bits 915*a* set to 2, and object 914*b*, with age bits 915*b* set to 1. Further, Eden 913*a* stores object 914*c*, with age bits 915*c* set to 0. During the third garbage collection cycle, the garbage collector moves object 914*b* to S0 913*b* and increments age bits 915*b* to 2. The garbage collector moves object 914*c* to S0 913*b* and increments age bits 915*c* to 1.

The garbage collector determines that the object age of object 914*a* has reached a promotion threshold of 2. The garbage collector transfers object 914*a* from the Young Generation 912*a* to the Old Generation 912*b*.

The age category classifier determines that object 914*a* has been transferred from the Young Generation 912*a* to the Old Generation 912*b*. The age category classifier assigns object 914*a* to the current age category, which is Transfer Age Category t0. The age category classifier stores information identifying Transfer Age Category t0 in age bits 915*a* of object 914*a*. When objects are in the Old Generation 912*b*, the age bits of the objects are configured to store a transfer age category of the objects.

The age category classifier assigns all objects transferred from the Young Generation 912*a* to the Old Generation 912*b* during the third garbage collection cycle to Transfer Age Category t0. The age category classifier accesses a system clock once during the third garbage collection cycle to determine that the current age category is Transfer Age Category t0. The age category classifier does not need to make additional accesses to the system clock to determine the transfer age category of each object transferred from the Young Generation 912*a* to the Old Generation 912*b* during the third garbage collection cycle.

After the third garbage collection cycle, the application instantiates additional objects (such as object 914*d*). The objects are allocated to Eden 913*a* of the Young Generation 912*a*. Object 914*d* is associated with age bits 915*d*, which are initially set to 0.

Figure 9E:
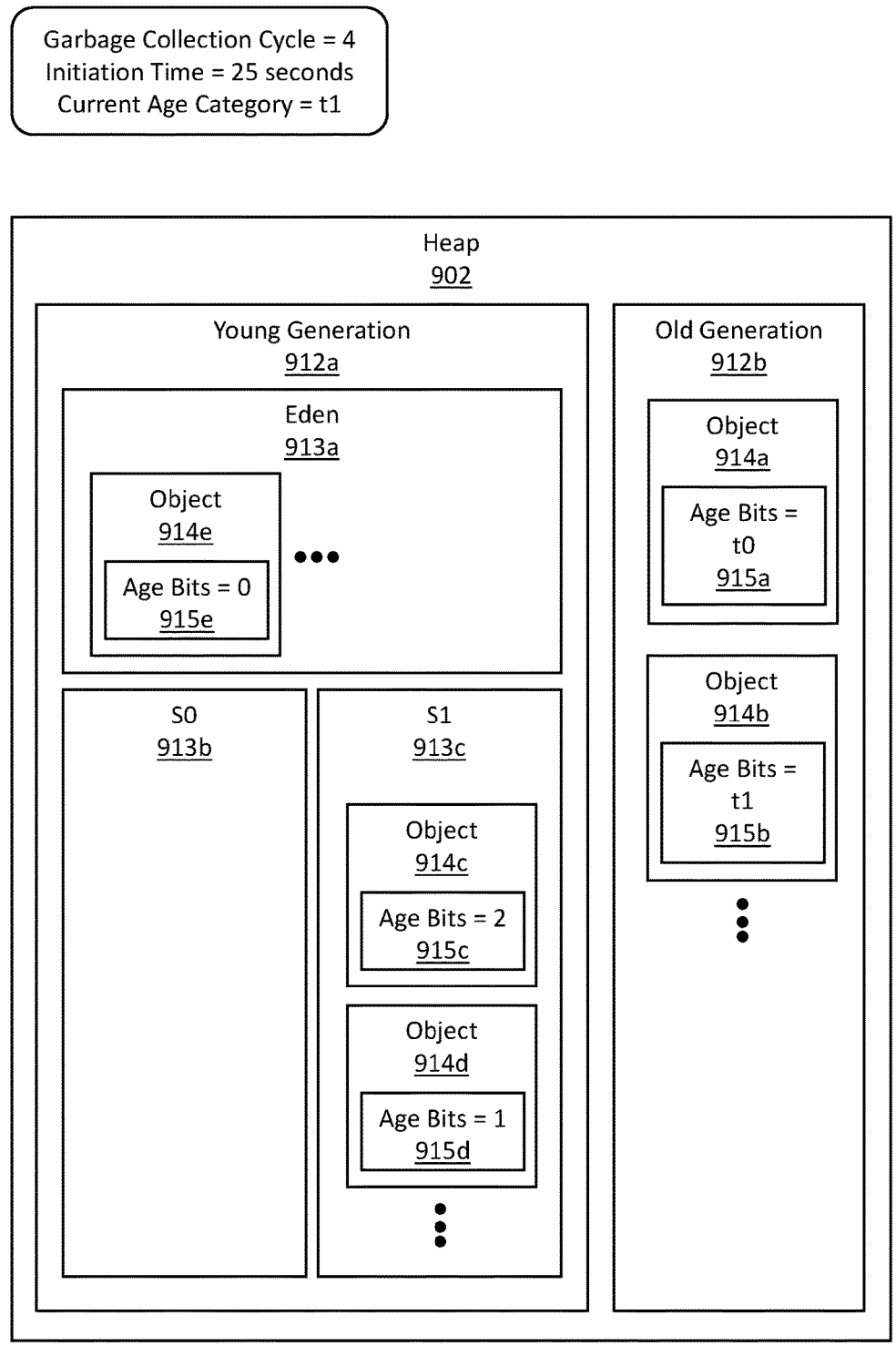

Referring to FIG. 9E, eventually, Eden 913*a* becomes full. A fourth garbage collection cycle is triggered. The time at which the fourth garbage collection cycle is initiated is 25 seconds after the initiation of the virtual machine. Since the time interval of Transfer Age Category t0 is 0 seconds to 19.99 seconds, the age category classifier determines that the initiation time of the fourth garbage collection cycle falls outside of the time interval of Transfer Age Category t0. The current age category is incremented to Transfer Age Category t1.

Before the initiation of the fourth garbage collection cycle, S0 913*b* stores object 914*b*, with age bits 915*b* set to 2, and object 914*c*, with age bits 915*c* set to 1. Further, Eden 913*a* stores object 914*d*, with age bits 915*d* set to 0. During the fourth garbage collection cycle, the garbage collector moves object 914*c* to S1 913*c* and increments age bits 915*c* to 2. The garbage collector moves object 914*d* to S1 913*c* and increments age bits 915*d* to 1.

The garbage collector determines that the object age of object 914*b* has reached the promotion threshold of 2. The garbage collector transfers object 914*b* from the Young Generation 912*a* to the Old Generation 912*b*.

The age category classifier determines that object 914*b* has been transferred from the Young Generation 912*a* to the Old Generation 912*b*. The age category classifier assigns object 914*b* to the current age category, which is Transfer Age Category t1. The age category classifier stores information identifying Transfer Age Category t1 in age bits 915*b* of object 914*b*.

The age category classifier assigns all objects transferred from the Young Generation 912*a* to the Old Generation 912*b* during the fourth garbage collection cycle to Transfer Age Category t1.

After the fourth garbage collection cycle, the application instantiates additional objects (such as object 914*e*). The objects are allocated to Eden 913*a* of the Young Generation 912*a*. Object 914*e* is associated with age bits 915*e*, which are initially set to 0.

Figure 9F:
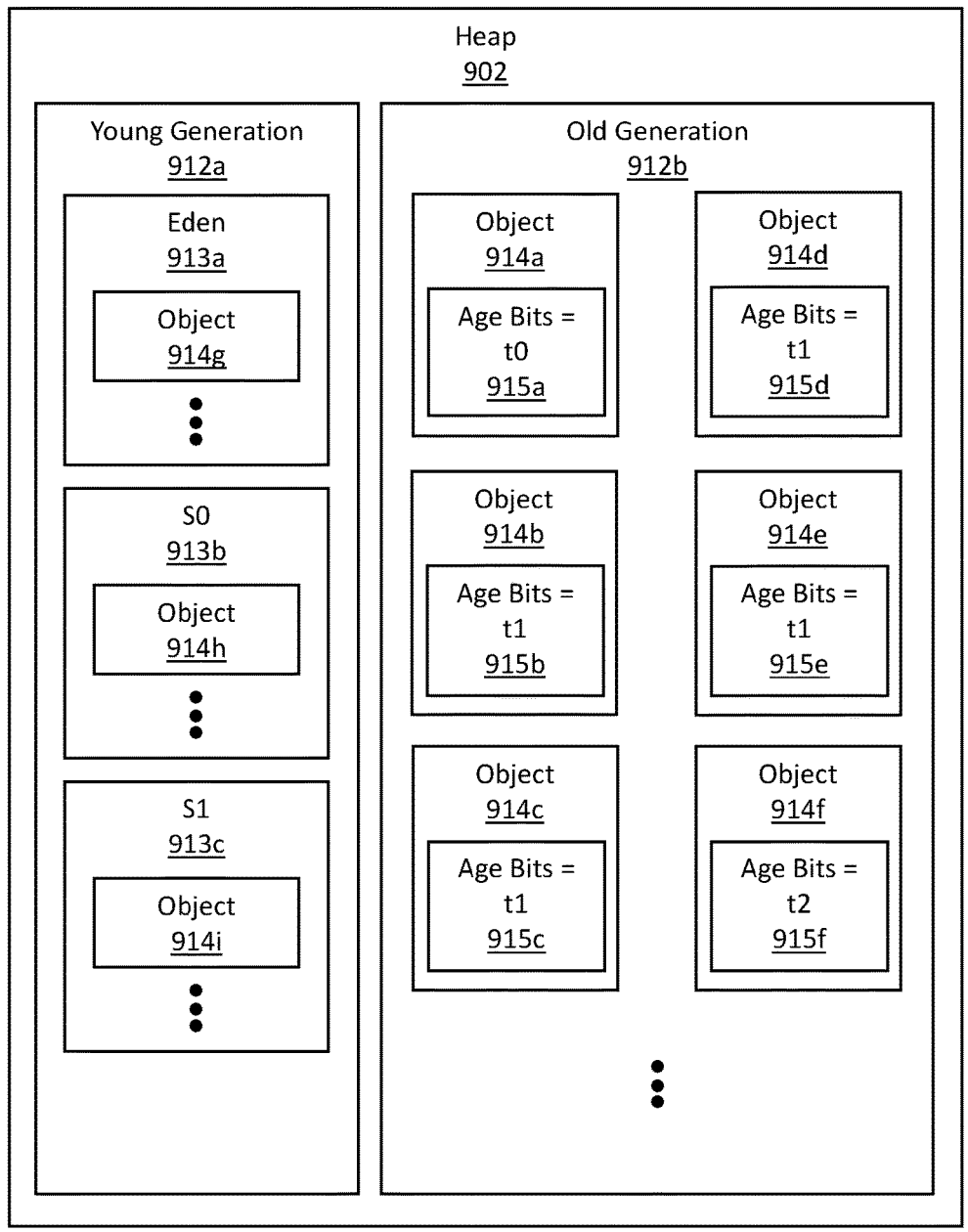

Accordingly, the application may continue to instantiate objects, and objects may continue to be promoted from the Young Generation 912*a* to the Old Generation 912*b* through a series of garbage collections. Referring to FIG. 9F, the nth garbage collection cycle has been triggered. The time at which the nth garbage collection cycle is initiated is 63 seconds after the initiation of the virtual machine. Since the time interval of Transfer Age Category t1 is 20 seconds to 59.99 seconds, the age category classifier determines that the initiation time of the nth garbage collection cycle falls outside of the time interval of Transfer Age Category t1. The current age category is incremented to Transfer Age Category t2.

During the nth garbage collection cycle, the garbage collector transfers object 914*f* from the Young Generation 912*a* to the Old Generation 912*b*. S0 913*b* stores object 914*h*. S1 913*c* stores object 914*i*. Meanwhile, objects 914*a-e* were previously transferred to the Old Generation 912*b*. Objects 914*a-e* may have been transferred to the Old Generation 912*b* during different garbage collection cycles.

The age category classifier determines that object 914*f* has been transferred from the Young Generation 912*a* to the Old Generation 912*b* during the nth garbage collection cycle. The age category classifier assigns object 914*f* to the current age category, which is Transfer Age Category t2. The age category classifier stores information identifying Transfer Age Category t2 in age bits 915*f* of object 914*f*.

The age category classifier assigns all objects transferred from the Young Generation 912*a* to the Old Generation 912*b* during the nth garbage collection cycle to Transfer Age Category t2.

After the nth garbage collection cycle, the application instantiates additional objects (such as object 914*g*). The objects are allocated to Eden 913*a* of the Young Generation 912*a*.

Meanwhile, a memory leak analyzer generates a heap dump of the Old Generation 912*b* after the nth garbage collection cycle and before the next (n+1) garbage collection cycle. The heap dump indicates that the Old Generation 912*b* includes:

object 914*a*, with age bits 915*a* set to Transfer Age Category t0;
object 914*b*, with age bits 915*b* set to Transfer Age Category t1;
object 914*c*, with age bits 915*c* set to Transfer Age Category t1;
object 914*d*, with age bits 915*d* set to Transfer Age Category t1;
object 914*e*, with age bits 915*e* set to Transfer Age Category t1; and
object 914*f*, with age bits 915*f* set to Transfer Age Category t2.

A user may select age categories of interest via a user interface. The user input indicates that Transfer Age Category t1 is of interest, but Transfer Age Category t0 and Transfer Age Category t2 are not of interest.

The memory leak analyzer determines that object 914*a* is associated with Transfer Age Category t0 based on age bits 915*a* in the header of object 914*a*. The memory leak analyzer determines that objects 914*b-e* are associated with Transfer Age Category t1 based on age bits 915*b-e* in the respective headers of objects 914*b-e*. The memory leak analyzer determines that object 914*f* is associated with Transfer Age Category t2 based on age bits 915*f* in the header of object 914*f*. The memory leak analyzer determines that object 914*a* and object 914*f* are not in an age category of interest, while objects 914*b-e* are in an age category of interest. Hence, the memory leak analyzer performs memory leak analysis on objects 914*b-e*, but not object 914*a* and object 914*f*.

Another example of determining age categories for objects stored in a heap is described below. A Java Virtual Machine (JVM) has been started with age classification enabled. Transfer age categories are determined and stored for the objects, according to the example age categories listed in Table 1. After two days of monitoring, a memory leak analyzer determines that the live set of objects continuously increases. Responsive to the continuous increase of the live set, the memory leak analyzer attempts an automated memory leak hunt. The memory leak analyzer, using various sources like class loading and compilation information, determines that the warmup seems to be complete 13 minutes after starting the JVM. Hence, objects in age category t4 (that is, 20 minutes to an hour after starting the JVM) likely should not continue to be live. The memory leak analyzer automatically checks if there are any objects associated with age category t4 (for example, using a class histogram). There are some instances of a user defined class called com.example.SystemDAO present, along with a few strings and byte arrays. The memory leak analyzer presents the end user with a class histogram of age category t4, plus a shortest path back to the thread roots, for a pre-selected amount of random instances from the types present in age category t4. The shortest path shows that the objects all are kept from a HashMap called cache in another user defined class com.example.DiscoveredSystemsCache. The end user determines that entries in the cache are never removed. The end user devises a solution to ensure that the oldest entries are removed when a certain limit is hit. Had the information not been actionable, the end user could have, for example, opted to do a two-dimensional class histogram on type X age category, and select a similar report for another age category.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
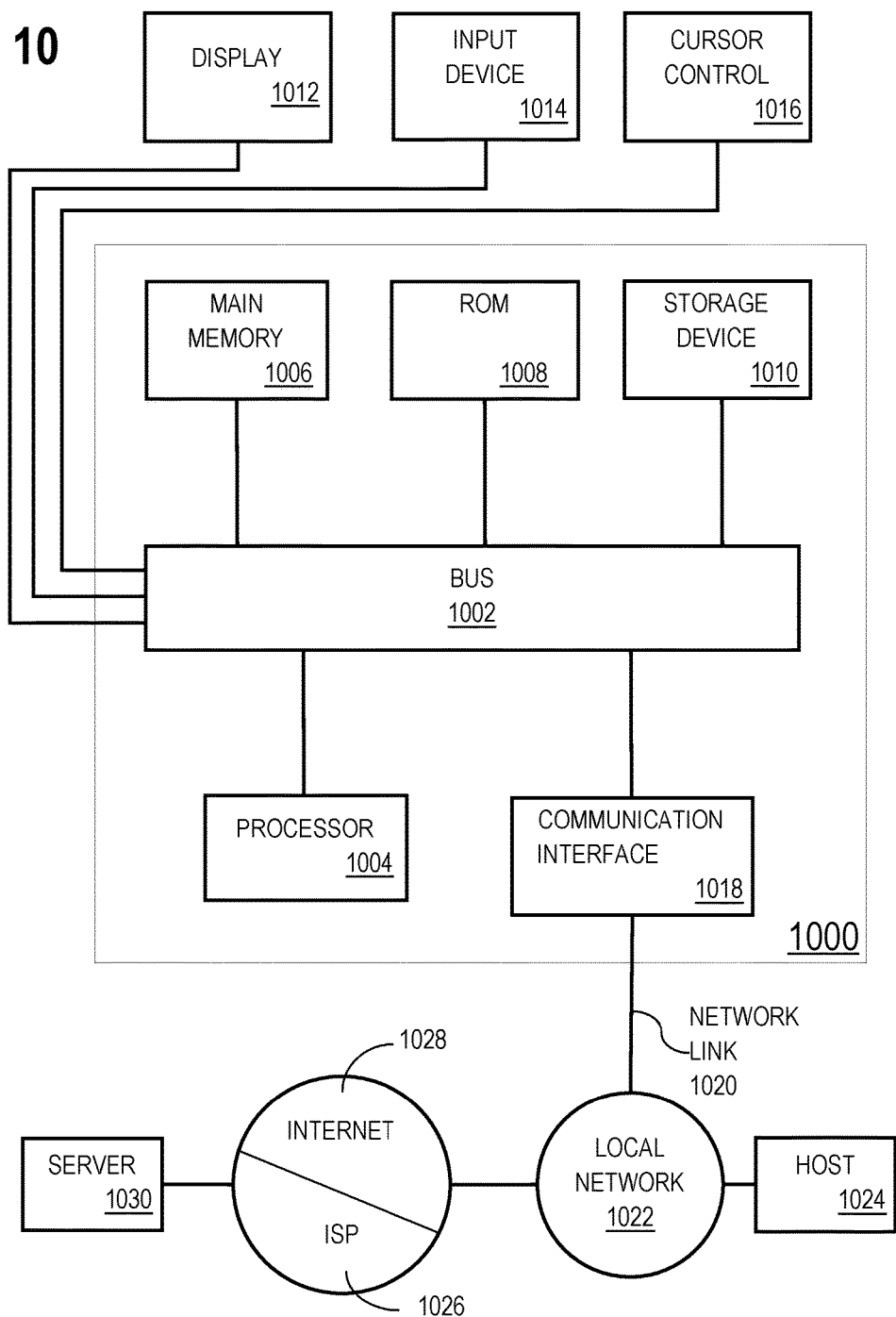
FIG. 10 illustrates a system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a set of objects that have been transferred from a first object group to a second object group in a garbage collection scheme;
   determining that a first subset of the set of objects that were transferred within a particular time period, relative to a reference event, based on information stored in headers of the first subset of objects;
   determining that a second subset of the set of objects that were not transferred within the particular time period, relative to the reference event, based on information stored in headers of the second subset of objects; and
   responsive to determining that the first subset of objects were transferred within the particular time: selecting the first subset of objects for memory leak analysis, without selecting the second subset of objects for memory leak analysis.

2. The medium of claim 1, wherein determining that the first subset of the set of objects that were transferred within the particular time period, relative to the reference event, comprises:
   identifying a plurality of age categories, each corresponding to a respective time period, relative to the reference event;
   selecting a subset of the plurality of age categories, each corresponding to a respective time period that overlaps with the particular time period;
   determining a respective transfer age category of each of the set of objects, based on information stored in headers of the set of objects; and
   determining that the first subset of objects are associated with the selected subset of the plurality of age categories.

3. The medium of claim 1, wherein the operations further comprise:
   performing the memory leak analysis on at least one of the first subset of objects, without performing the memory leak analysis on any of the second subset of objects.

4. The medium of claim 1, wherein the memory leak analysis comprises at least one of:
   a shortest path to roots analysis on the first subset of objects;
   a dominator tree analysis on the first subset of objects;
   an analysis regarding class loaders for the first subset of objects; and
   an analysis regarding classes or types associated with the first subset of objects.

5. The medium of claim 1, wherein the operations further comprise:
   performing the memory leak analysis on at least one of the first subset of objects, while a virtual machine continues to execute an application that generated the set of objects.

6. A method, comprising:
   identifying a set of objects that have been transferred from a first object group to a second object group in a garbage collection scheme;
   determining that a first subset of the set of objects that were transferred within a particular time period, relative to a reference event, based on information stored in headers of the first subset of objects;
   determining that a second subset of the set of objects that were not transferred within the particular time period, relative to the reference event, based on information stored in headers of the second subset of objects; and
   responsive to determining that the first subset of objects were transferred within the particular time: selecting the first subset of objects for memory leak analysis, without selecting the second subset of objects for memory leak analysis;
   wherein the method is performed by at least one device including a hardware processor.

7. The method of claim 6, wherein determining that the first subset of the set of objects that were transferred within the particular time period, relative to the reference event, comprises:
   identifying a plurality of age categories, each corresponding to a respective time period, relative to the reference event;
   selecting a subset of the plurality of age categories, each corresponding to a respective time period that overlaps with the particular time period;
   determining a respective transfer age category of each of the set of objects, based on information stored in headers of the set of objects; and
   determining that the first subset of objects are associated with the selected subset of the plurality of age categories.

8. The method of claim 6, further comprising:
   performing the memory leak analysis on at least one of the first subset of objects, without performing the memory leak analysis on any of the second subset of objects.

9. The method of claim 6, wherein the memory leak analysis comprises at least one of:
   a shortest path to roots analysis on the first subset of objects;
   a dominator tree analysis on the first subset of objects;
   an analysis regarding class loaders for the first subset of objects; and
   an analysis regarding classes or types associated with the first subset of objects.

10. The method of claim 6, further comprising:
    performing the memory leak analysis on at least one of the first subset of objects, while a virtual machine continues to execute an application that generated the set of objects.

11. A system, comprising:
    at least one device including a hardware processor; and
    the system being configured to perform operations comprising:
    identifying a set of objects that have been transferred from a first object group to a second object group in a garbage collection scheme;
    determining that a first subset of the set of objects that were transferred within a particular time period, relative to a reference event, based on information stored in headers of the first subset of objects;
    determining that a second subset of the set of objects that were not transferred within the particular time period, relative to the reference event, based on information stored in headers of the second subset of objects; and responsive to determining that the first subset of objects were transferred within the particular time: selecting the first subset of objects for memory leak analysis, without selecting the second subset of objects for memory leak analysis.

12. The system of claim 11, wherein determining that the first subset of the set of objects that were transferred within the particular time period, relative to the reference event, comprises:
identifying a plurality of age categories, each corresponding to a respective time period, relative to the reference event;
selecting a subset of the plurality of age categories, each corresponding to a respective time period that overlaps with the particular time period;
determining a respective transfer age category of each of the set of objects, based on information stored in headers of the set of objects; and
determining that the first subset of objects are associated with the selected subset of the plurality of age categories.

13. The system of claim 11, wherein the operations further comprise:
performing the memory leak analysis on at least one of the first subset of objects, without performing the memory leak analysis on any of the second subset of objects.

14. The system of claim 11, wherein the memory leak analysis comprises at least one of:
a shortest path to roots analysis on the first subset of objects;
a dominator tree analysis on the first subset of objects;
an analysis regarding class loaders for the first subset of objects; and
an analysis regarding classes or types associated with the first subset of objects.

15. The system of claim 11, wherein the operations further comprise:
performing the memory leak analysis on at least one of the first subset of objects, while a virtual machine continues to execute an application that generated the set of objects.

16. A non-transitory computer readable medium comprising instructions which, when executed by one or more hardware processors, causes performance of operations comprising:
generating a plurality of age categories corresponding to a respective plurality of time intervals;
determining a first duration of time that has elapsed between (a) a first event associated with a first garbage collection cycle and (b) a reference event;
determining a first current age category, from the plurality of age categories, corresponding to the first duration of time that has elapsed between (a) the first event associated with the garbage collection cycle and (b) the reference event;
identifying a first object being transferred from a first object group to a second object group during the first garbage collection cycle; and storing the first current age category as a first transfer age category in a first header of the first object upon transfer of the first object from the first object group to the second object group;
determining a second duration of time that has elapsed between (a) a second event associated with a second garbage collection cycle and (b) the reference event;
determining a second current age category, from the plurality of age categories, corresponding to the second duration of time that has elapsed between (a) the second event associated with the second garbage collection cycle and (b) the reference event;
identifying a second object being transferred from the first object group to the second object group during the second garbage collection cycle;
storing the second current age category as a second transfer age category in a second header of the second object upon transfer of the second object from the first object group to the second object group;
selecting the second object, but not the first object, for memory leak analysis, based on the first transfer age category of the first object and the second transfer age category of the second object; and
performing the memory leak analysis on the second object, without performing the memory leak analysis on the first object.

17. The medium of claim 16, wherein the operations further comprise: storing the first current age category as a respective transfer age category in headers of all objects being transferred from the first object group to the second object group during the first garbage collection cycle.

18. The medium of claim 16, wherein:
after the transfer of the first object from the first object group to the second object group: a plurality of bits in the first header is configured to store information identifying the first transfer age category; and
prior to the transfer of the first object from the first object group to the second object group: the plurality of bits is configured to store information associated with the first object, other than one of the plurality of age categories.

19. The medium of claim 16, wherein the operations further comprise:
subsequent to the transfer of the first object from the first object group to the second object group:
determining a minimum duration of time that has elapsed between (a) the transfer of the first object from the first object group to the second object group, and (b) the reference event, based on the first transfer age category stored in the first header of the first object, without using any information external to the first object.

20. The medium of claim 16, wherein the first object group comprises a first generation in a garbage collection scheme and the second object group comprises a second generation in the garbage collection scheme, and the first generation is younger than the second generation.

* * * * *

UNITED STATES PATENT AND TRADEMARK OFFICE
CERTIFICATE OF CORRECTION

PATENT NO. : 10,346,086 B2
APPLICATION NO. : 15/617319
DATED : July 9, 2019
INVENTOR(S) : Hirt et al.

Page 1 of 1

It is certified that error appears in the above-identified patent and that said Letters Patent is hereby corrected as shown below:

In the Drawings

On sheet 2 of 15, in FIG. 2, under Reference Numeral 200, Line 1, delete "Flle" and insert -- File --, therefor.

Signed and Sealed this
Twenty-eighth Day of July, 2020

Andrei Iancu
*Director of the United States Patent and Trademark Office*